US012558945B2

(12) United States Patent
Kume et al.

(10) Patent No.: US 12,558,945 B2
(45) Date of Patent: Feb. 24, 2026

(54) VEHICLE DOOR DEVICE

(71) Applicant: AISIN CORPORATION, Kariya (JP)

(72) Inventors: Sho Kume, Kariya (JP); Masato Kumano, Kariya (JP)

(73) Assignee: AISIN CORPORATION, Kariya (JP)

( * ) Notice: Subject to any disclaimer, the term of this patent is extended or adjusted under 35 U.S.C. 154(b) by 302 days.

(21) Appl. No.: 18/049,811

(22) Filed: Oct. 26, 2022

(65) Prior Publication Data

US 2023/0191883 A1 Jun. 22, 2023

(30) Foreign Application Priority Data

Dec. 21, 2021 (JP) ................................. 2021-207142

(51) Int. Cl.
*B60J 5/04* (2006.01)
*E05D 15/10* (2006.01)
*E05F 15/649* (2015.01)

(52) U.S. Cl.
CPC .......... *B60J 5/0479* (2013.01); *E05D 15/101* (2013.01); *E05F 15/649* (2015.01); *E05Y 2900/531* (2013.01)

(58) Field of Classification Search
CPC ...... B60J 5/0479; B60J 5/0472; B60J 5/0473; B60J 5/047; E05D 15/101; E05D 11/0054; E05F 15/649; E05Y 2900/531; E06B 7/367
See application file for complete search history.

(56) References Cited

U.S. PATENT DOCUMENTS

| | | | |
|---|---|---|---|
| 3,095,600 A | 7/1963 | Bretzner | |
| 4,678,198 A * | 7/1987 | Nomura | B60J 5/047 |
| | | | 49/246 |
| 5,244,247 A * | 9/1993 | Kuwabara | E05D 3/127 |
| | | | 296/146.12 |
| 6,305,737 B1 * | 10/2001 | Corder | E05F 15/63 |
| | | | 296/146.12 |
| 6,793,268 B1 * | 9/2004 | Faubert | B60J 5/06 |
| | | | 296/146.12 |
| 2020/0032569 A1 | 1/2020 | Taylor et al. | |

FOREIGN PATENT DOCUMENTS

| | | | | | |
|---|---|---|---|---|---|
| FR | 2726511 A1 * | 5/1996 | | | B60J 5/047 |
| GB | 1444219 A * | 7/1976 | | | B60J 5/0497 |
| JP | 5-112130 A | 5/1993 | | | |
| JP | 2006-90097 A | 4/2006 | | | |
| JP | 2006-328916 A | 12/2006 | | | |
| WO | WO-2004/074613 A1 | 9/2004 | | | |
| WO | WO-2010077060 A1 * | 7/2010 | | | E06B 7/367 |

* cited by examiner

*Primary Examiner* — Daniel J Colilla
(74) *Attorney, Agent, or Firm* — Oblon, McClelland, Maier & Neustadt, L.L.P.

(57) ABSTRACT

A vehicle door device includes first and second link arms having a first rotary coupling point with respect to a vehicle body and a second rotary coupling point with respect to a front door of a vehicle. The front door is opened toward a vehicle front side based on an operation of a link mechanism formed of the first and second link arms. The first link arm has the first rotary coupling point inside a dash panel provided at a front portion of a vehicle interior.

10 Claims, 14 Drawing Sheets

F I G. 5
SHORTENED STATE
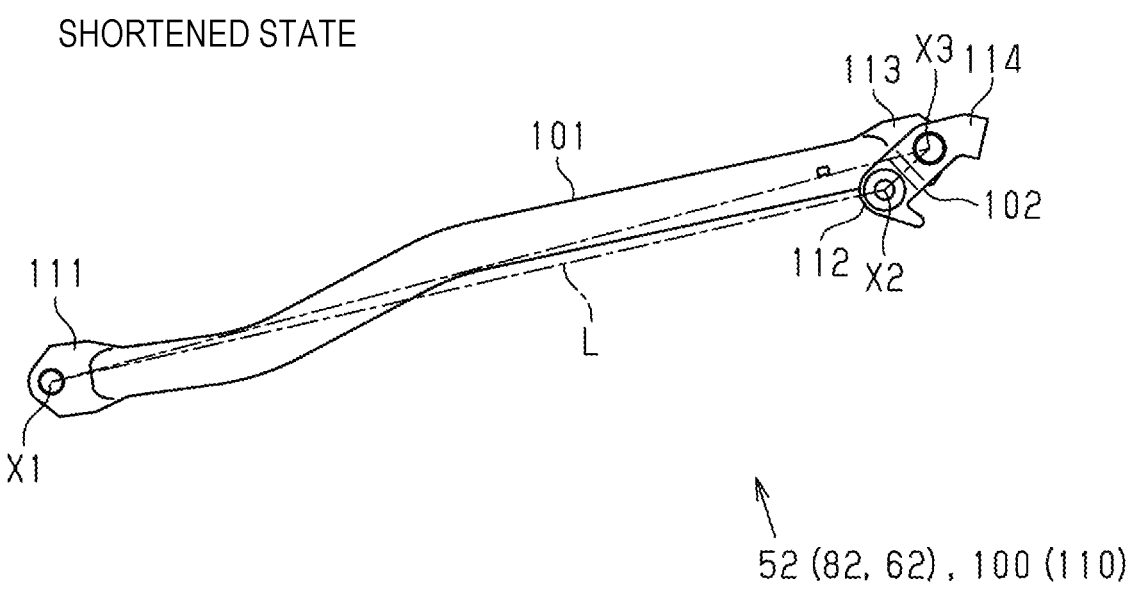
52 (82, 62) , 100 (110)
F I G. 6
EXTENDED STATE : P0
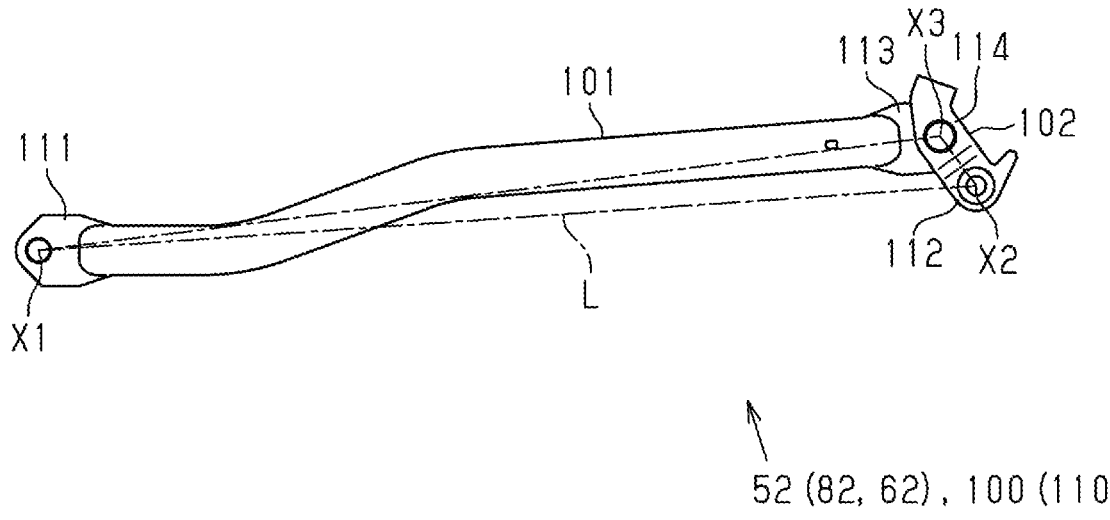
52 (82, 62) , 100 (110)

FIG. 9

F I G. 10
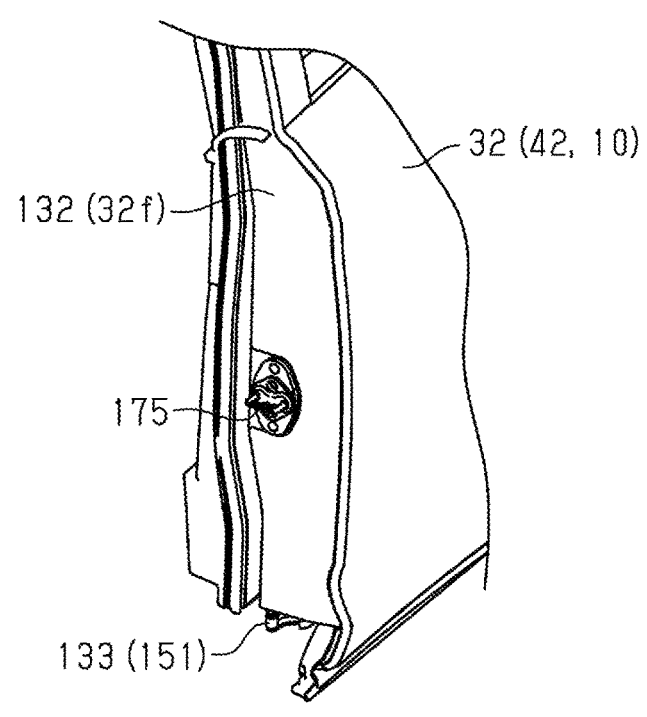
F I G. 11
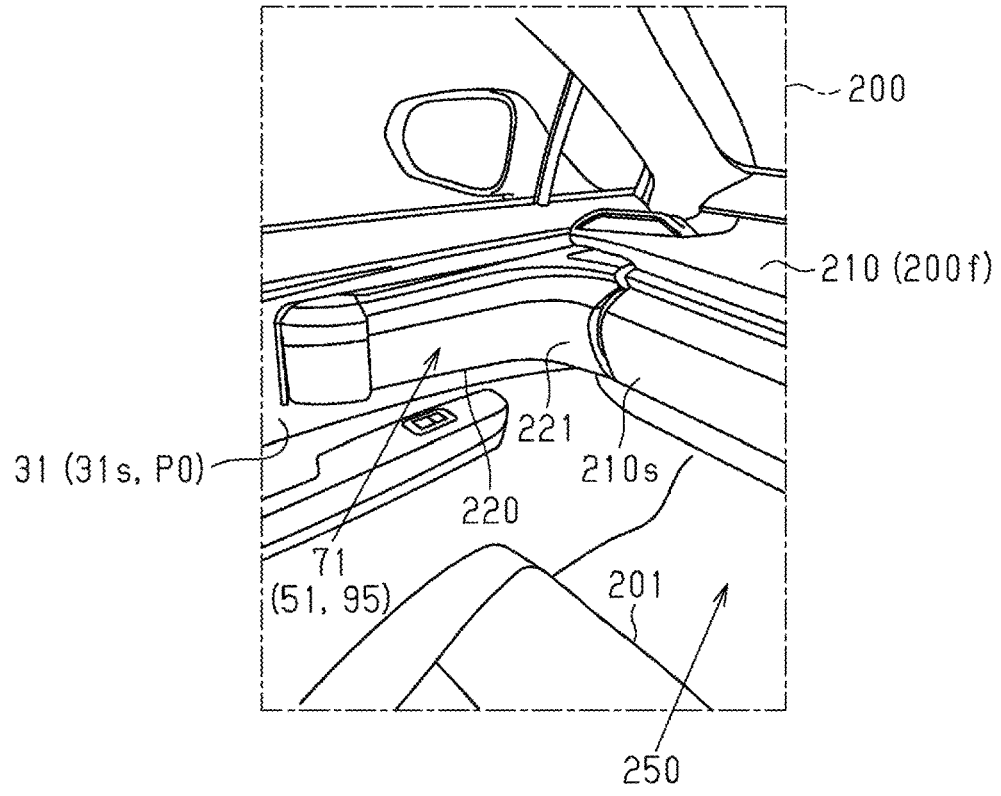

F I G. 12
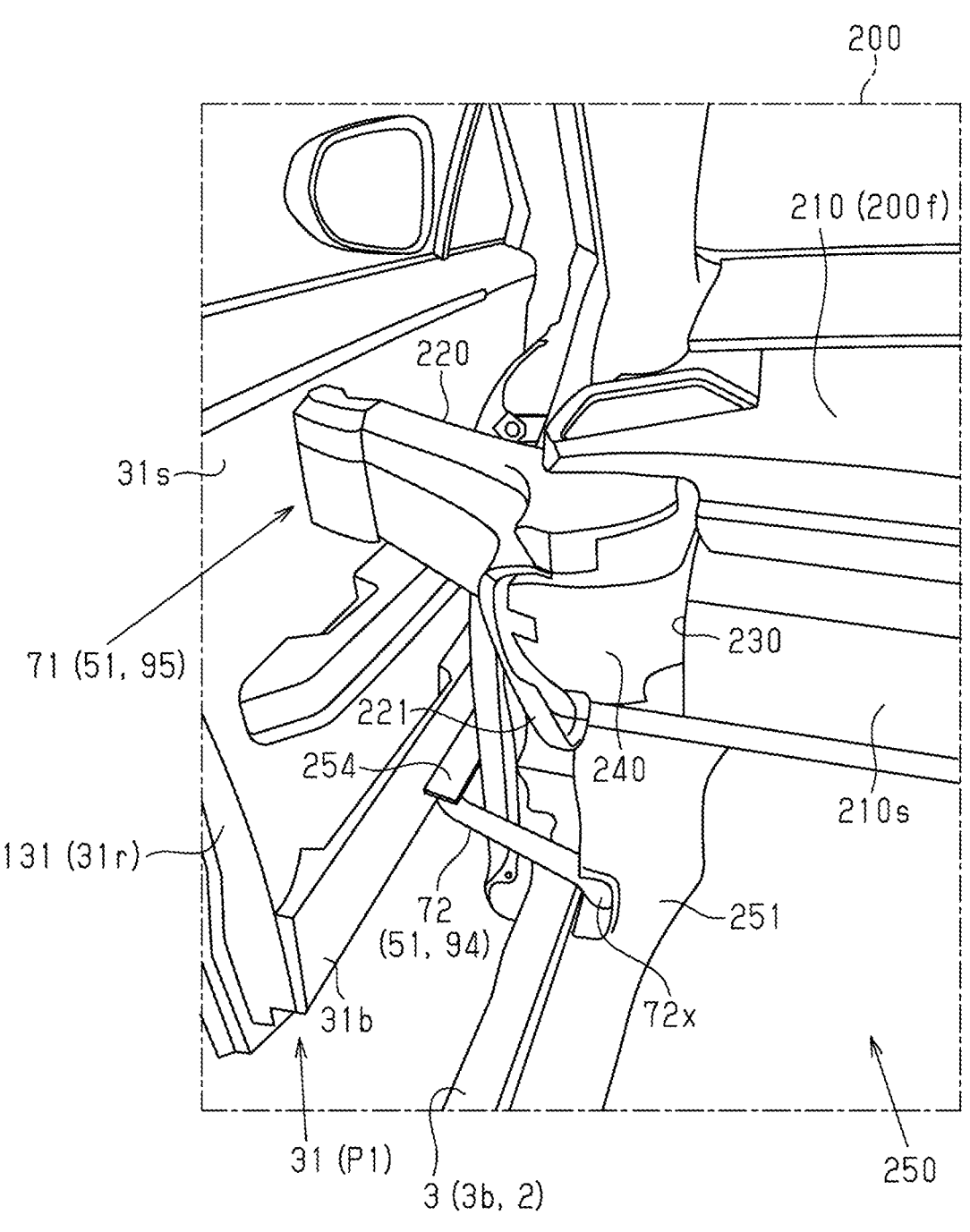

F I G. 13
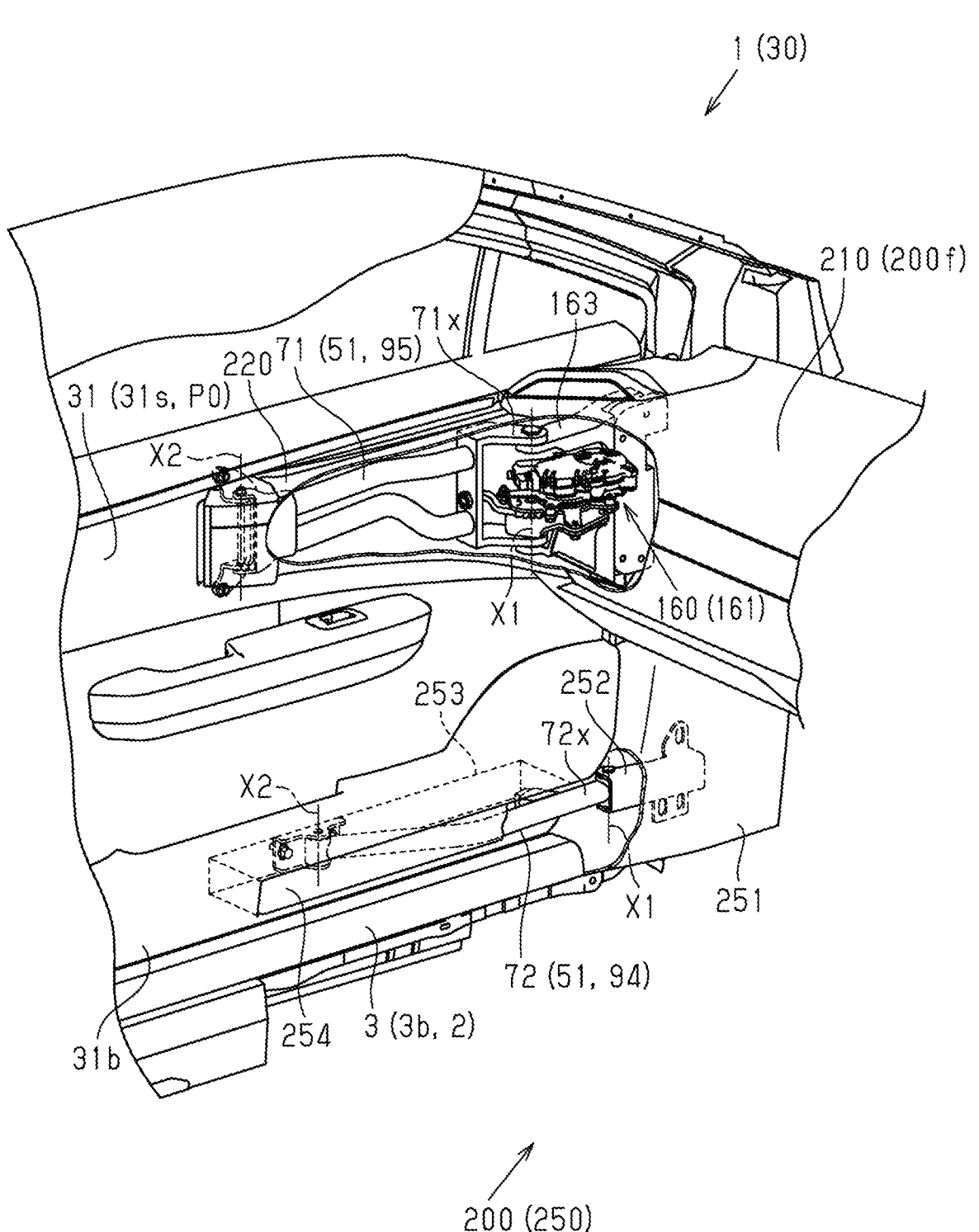

F I G. 14

F I G. 15
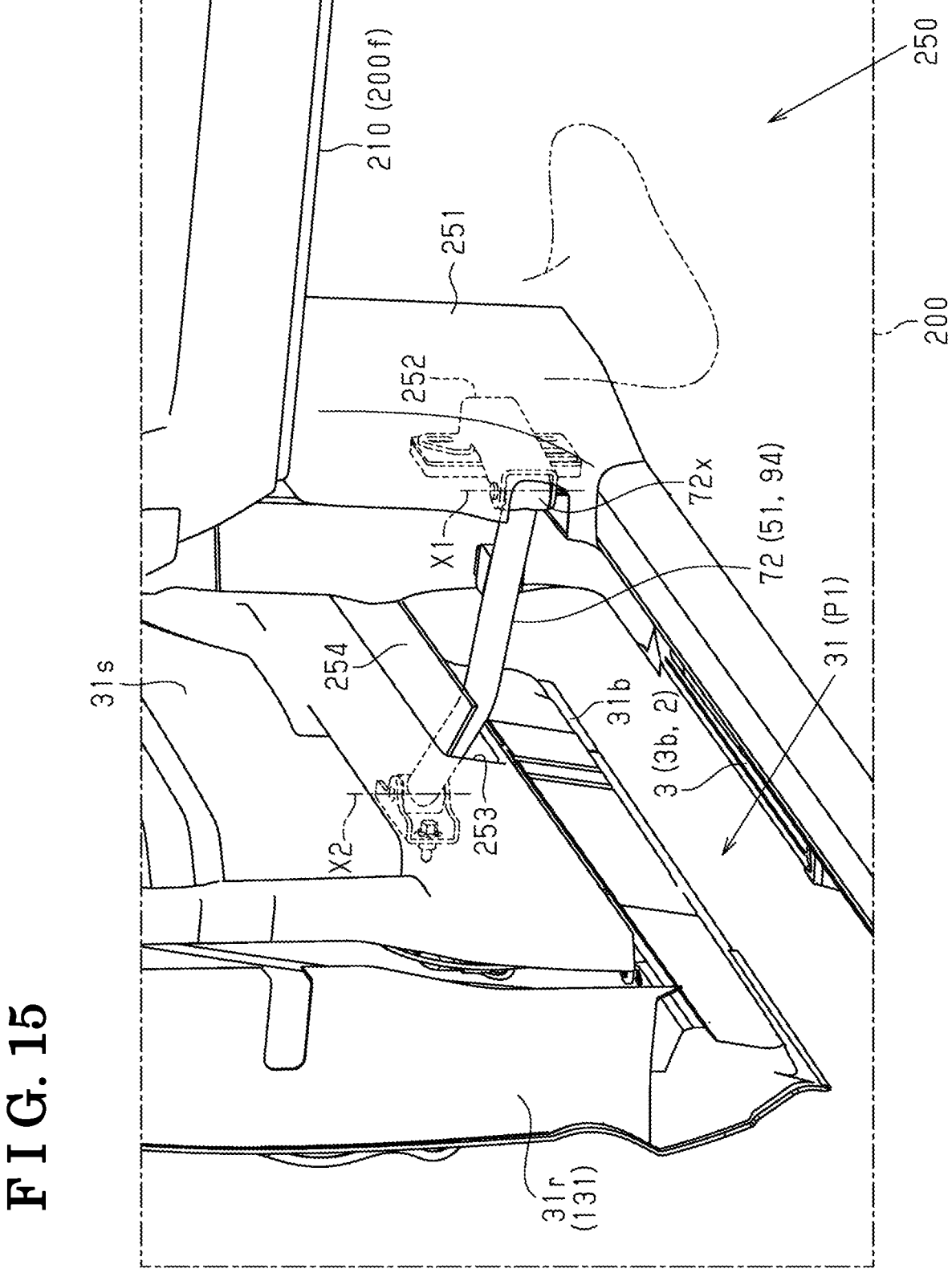

VEHICLE DOOR DEVICE

CROSS REFERENCE TO RELATED APPLICATIONS

This application is based on and claims priority under 35 U.S.C. § 119 to Japanese Patent Application 2021-207142, filed on Dec. 21, 2021, the entire content of which is incorporated herein by reference.

TECHNICAL FIELD

This disclosure relates to a vehicle door device.

BACKGROUND DISCUSSION

In the related art, there is a vehicle door device including first and second link arms having a first rotary coupling point with respect to a vehicle body and a second rotary coupling point with respect to a door of a vehicle. In such a vehicle door device, a door provided at a door opening thereof is opened and closed based on an operation of a link mechanism formed of the first and second link arms. For example, JP 2006-90097A discloses a configuration in which each link arm forming the link mechanism is stored outside a door opening attached to a terminal portion of a vehicle body side portion and inside a weather strip attached to a vehicle inner side of the door when the door is in a closed state. Further, by adopting the configuration in which the door of the vehicle is opened and closed using such a link mechanism, it is possible to secure a larger door opening amount while preventing a displacement of the opened door in a vehicle width direction.

However, a door device in the related art is assumed to be applied to a rear door of the vehicle. For this reason, for example, adaptability to a front door of the vehicle may be low, such as mountability to the vehicle and getting-on-and-off performance for an occupant.

SUMMARY

According to an aspect of this disclosure, a vehicle door device that solves the above problem includes: first and second link arms having a first rotary coupling point with respect to a vehicle body and a second rotary coupling point with respect to a front door of a vehicle. The front door is opened toward a vehicle front side based on an operation of a link mechanism formed of the first and second link arms, and the first link arm has the first rotary coupling point inside a dash panel provided at a front portion of a vehicle interior.

BRIEF DESCRIPTION OF THE DRAWINGS

The foregoing and additional features and characteristics of this disclosure will become more apparent from the following detailed description considered with the reference to the accompanying drawings, wherein:

Figure 1:
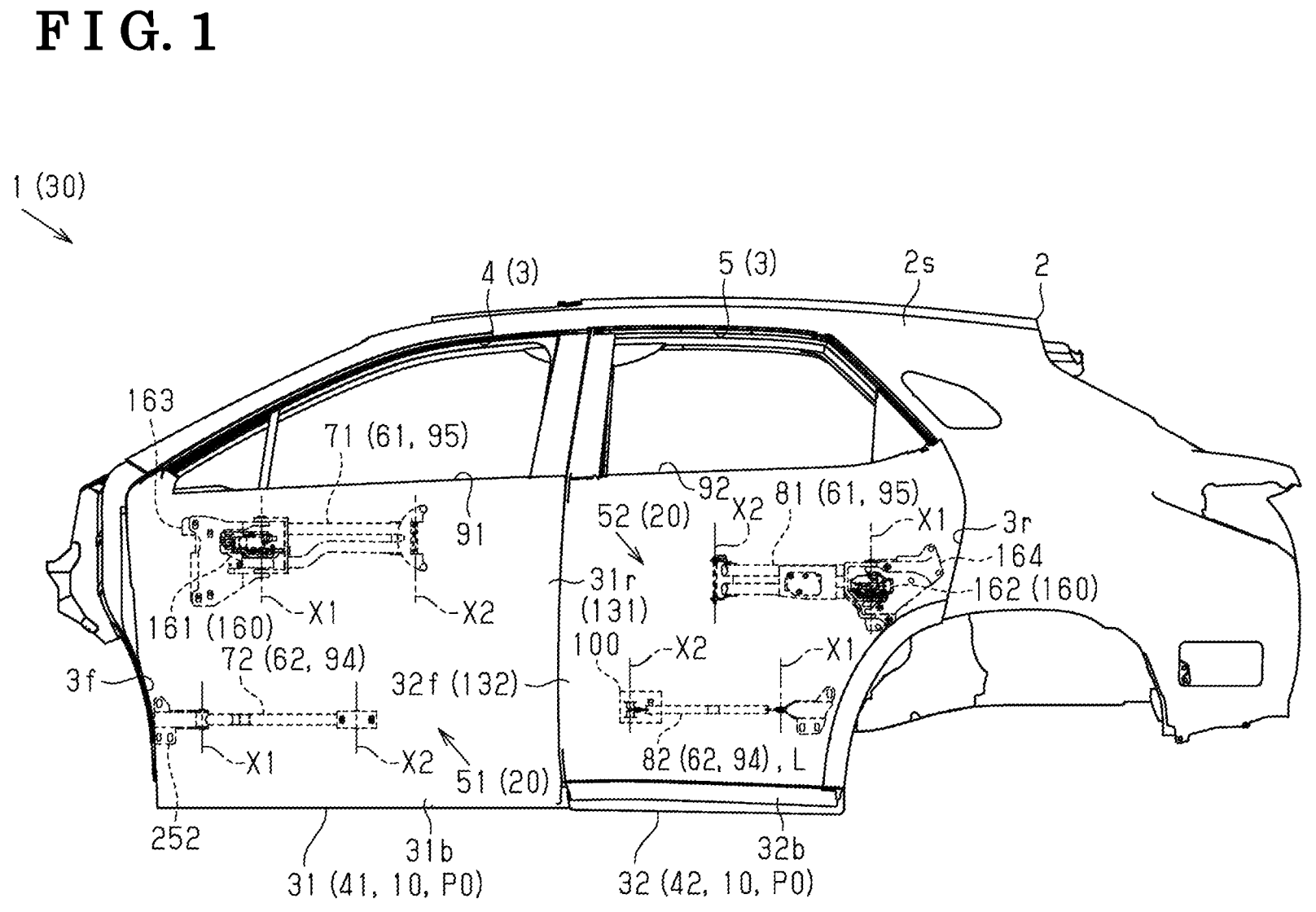

FIG. 1 is a front view of a front door and a rear door that are provided at a door opening of a vehicle;

Figure 2:
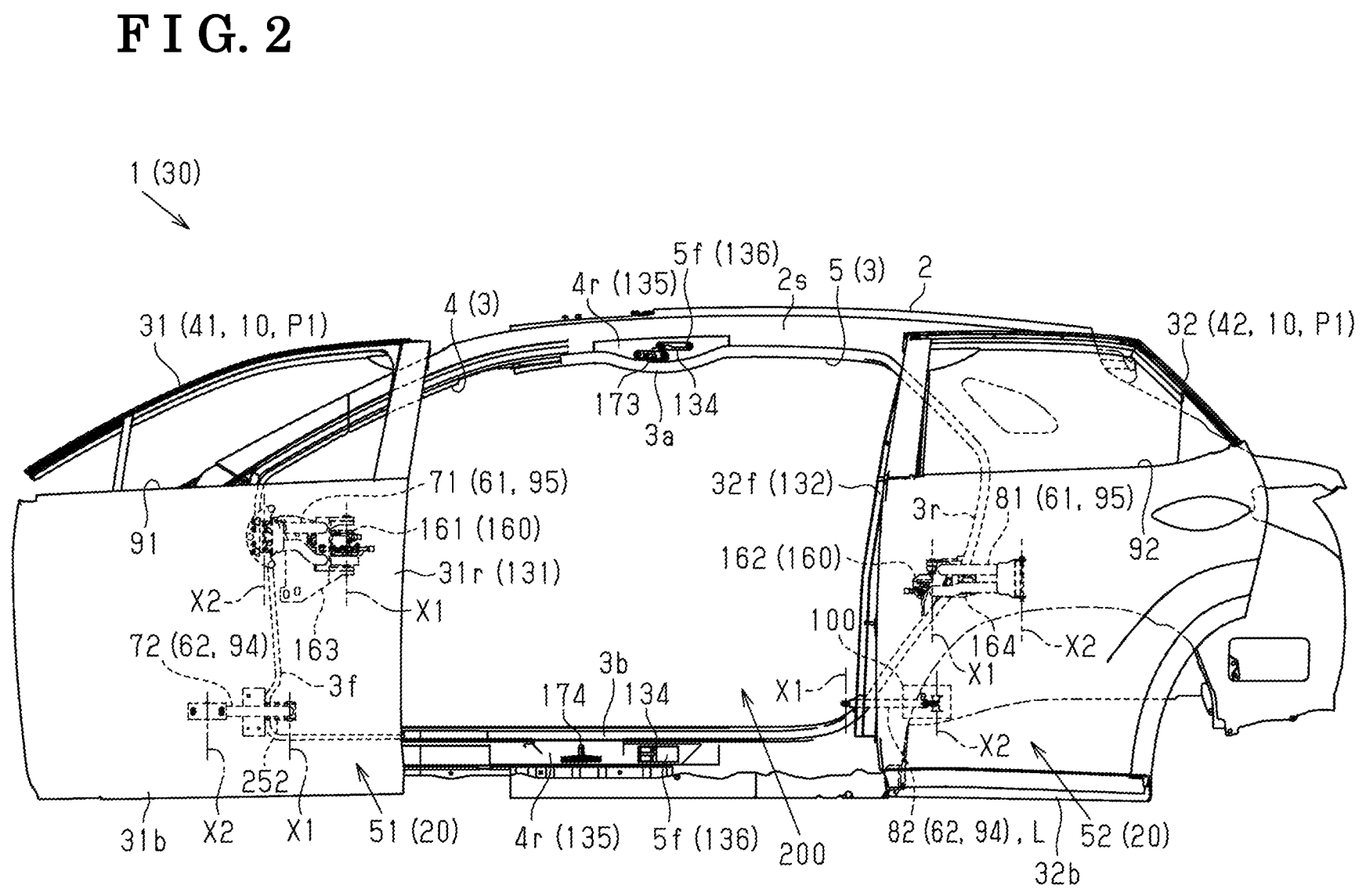

FIG. 2 is a front view of the front door and the rear door that are provided at the door opening of the vehicle;

FIG. 4 is a perspective view of the door device that opens and closes the front door and the rear door of the vehicle;

FIG. 5 is a plan view of a joint link mechanism constituting a coupling length variable mechanism;

FIG. 6 is a plan view of the joint link mechanism constituting the coupling length variable mechanism;

FIG. 9 is a schematic configuration diagram of a door lock system that restrains the front door and the rear door at the fully closed position;

FIG. 10 is a perspective view of the vicinity of a front end portion of the rear door;

FIG. 11 is an external view of a vehicle interior in the vicinity of a front door supported by a link mechanism formed of first and second link arms and a dash panel disposed at a front portion of the vehicle interior;

FIG. 12 is an external view of the vicinity of the front door and the dash panel;

FIG. 13 is an external view of the vicinity of the front door and the dash panel with a partial cross section showing the arrangement of the first and second link arms;

FIG. 14 is an external view of the vehicle interior showing a positional relationship among the front door, a link cover, and the dash panel when the front door is in a fully closed state;

FIG. 15 is an external view of the vicinity of a foot space formed below the dash panel;

DETAILED DESCRIPTION

Figure 3:
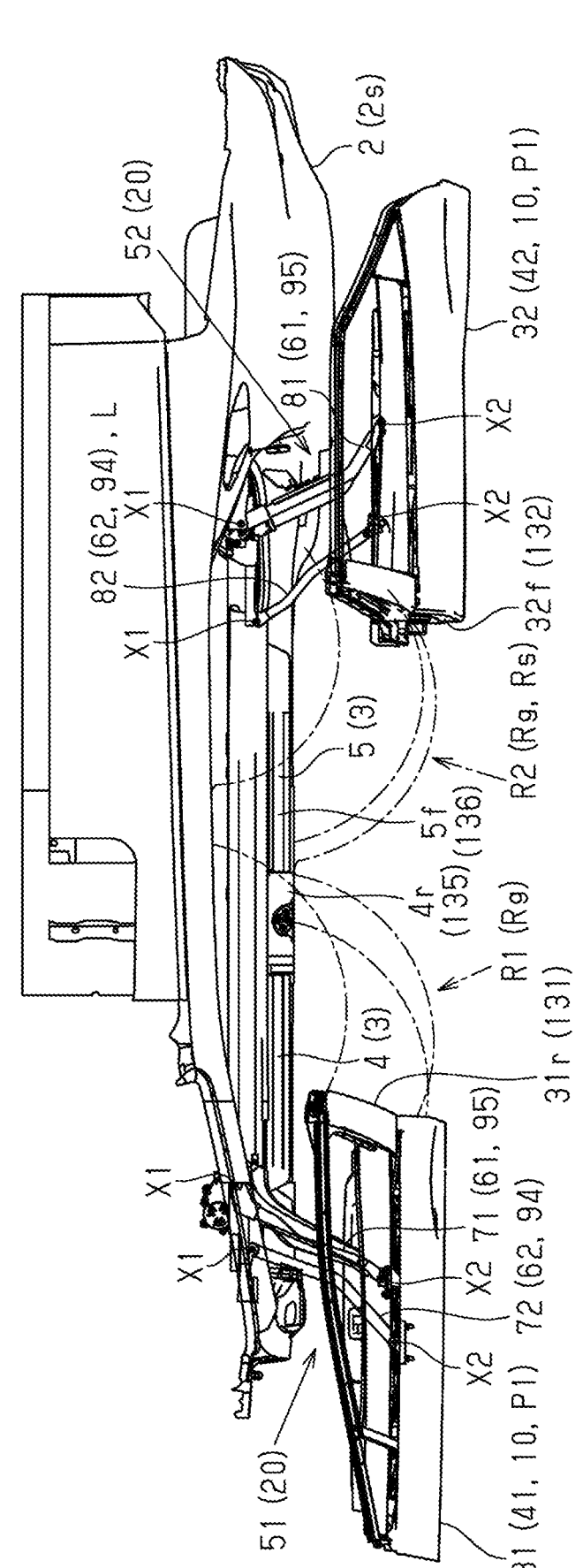
FIG. 3 is a top view of a door device that opens and closes the front door and the rear door of the vehicle.
Figure 3:

Hereinafter, an embodiment of a vehicle door device will be described with reference to the drawings.

As shown in FIGS. 1 to 4, a vehicle 1 according to the present embodiment has a door opening 3 formed in a side surface 2s of a vehicle body 2. In the vehicle 1 according to the present embodiment, the door opening 3 does not have a pillar structure at a central portion in a vehicle front-rear direction (a left-right direction in each drawing), and has a so-called pillarless structure in which a front opening 4 and a rear opening 5 are integrated. The vehicle 1 according to the present embodiment includes a pair of doors 10, 10 provided in the door opening 3. In the vehicle 1 according to the present embodiment, the doors 10, 10 are provided side by side in the vehicle front-rear direction, that is, in an opening width direction of the door opening 3. Further, the doors 10, 10 are supported by the vehicle body 2 via link mechanisms 20, 20 provided independently of each other. Accordingly, in the vehicle 1 according to the present embodiment, based on an operation of the link mechanisms 20, 20, a vehicle door device 30 capable of independently opening and closing the pair of doors 10, 10 provided in the door opening 3 in opposite directions is formed.

That is, in the vehicle 1 according to the present embodiment, the door 10 disposed in the front opening 4 constituting a front portion (a left side in each drawing) of the door opening 3 constitutes a front door 31 of the vehicle 1. The door 10 disposed in the rear opening 5 constituting a rear portion (a right side in each drawing) of the door opening 3 constitutes a rear door 32 of the vehicle 1. Further, in the vehicle door device 30 according to the present embodiment, the front door 31 serves as a first door 41. The link mechanism 20 supporting the first door 41 constitutes a first link mechanism 51. The rear door 32 serves as a second door 42. The link mechanism 20 supporting the second door 42 constitutes a second link mechanism 52.

Specifically, in the vehicle door device 30 according to the present embodiment, each of the link mechanisms 20, 20 includes first and second link arms 61, 62 that are independent from each other. Further, the first and second link arms 61, 62 each have a first rotary coupling point X1 with respect to the vehicle body 2 and a second rotary coupling point X2 with respect to the door 10 of the vehicle 1. Accordingly, in the vehicle door device 30 according to the present embodiment, the link mechanisms 20, 20 constituting the first and second link mechanisms 51, 52 each have a configuration as a four-bar link mechanism independent of each other.

Specifically, first and second link arms 71, 72 forming the first link mechanism 51 each have a first rotary coupling point X1 rotatably coupled to the vehicle body 2 in the vicinity of a front edge portion 3*f* of the door opening 3. The first and second link arms 71, 72 each have a second rotary coupling point X2 rotatably coupled to the first door 41 constituting the front door 31 of the vehicle 1. Further, first and second link arms 81, 82 forming the second link mechanism 52 each have a first rotary coupling point X1 rotatably coupled to the vehicle body 2 in the vicinity of a rear edge portion 3*r* of the door opening 3. The first and second link arms 81, 82 each have a second rotary coupling point X2 rotatably coupled to the second door 42 constituting the rear door 32 of the vehicle 1.

In the first and second link mechanisms 51, 52, the first link arms 71, 81 are disposed above the second link arms 72, 82 with which the first link arms 71, 81 are paired. Specifically, the first link arms 71, 81 are disposed at heights below windows 91, 92 of the vehicle 1 formed of the front door 31 and the rear door 32, respectively, that is, near a so-called belt line. The second link arms 72, 82 are disposed at heights in the vicinity of lower end portions 31*b*, 32*b* of the front door 31 and the rear door 32, respectively.

That is, in the vehicle door device 30 according to the present embodiment, the first link arms 71, 81 have the second rotary coupling points X2 at positions that are closer to centers of gravity of the front door 31 and the rear door 32 than are the second link arms 72, 82. Accordingly, the vehicle door device 30 according to the present embodiment is implemented such that, in both the first and second link mechanisms 51, 52, the first link arms 71, 81 support a larger door load than the second link arms 72, 82.

Specifically, in the vehicle door device 30 according to the present embodiment, each of the second link arms 72, 82 positioned as a sub-link 94 is formed using one shaft-shaped member. On the other hand, each of the first link arms 71, 81 positioned as a main link 95 is formed by coupling two parallel shaft-shaped members. Accordingly, the vehicle door device 30 according to the present embodiment imparts high support rigidity to each of the first link arms 71, 81.

More specifically, as shown in FIG. 3, in the vehicle door device 30 according to the present embodiment, when the front door 31 is opened, the first and second link arms 71, 72 of the first link mechanism 51 rotate about the first rotary coupling points X1 in a clockwise direction in FIG. 3. Accordingly, in the vehicle door device 30 according to the present embodiment, the front door 31 supported by the first and second link arms 71, 72 is opened toward a vehicle front side.

In the vehicle door device 30 according to the present embodiment, when the front door 31 is closed, the first and second link arms 71, 72 rotate about the first rotary coupling points X1 in a counterclockwise direction in FIG. 3. Accordingly, in the vehicle door device 30 according to the present embodiment, the front door 31 supported by the first and second link arms 71, 72 is closed toward a vehicle rear side.

On the other hand, in the vehicle door device 30 according to the present embodiment, when the rear door 32 is opened, the first and second link arms 81, 82 of the second link mechanism 52 rotate about the first rotary coupling points X1 in the counterclockwise direction in FIG. 3. Accordingly, in the vehicle door device 30 according to the present embodiment, the rear door 32 supported by the first and second link arms 81, 82 is opened toward the vehicle rear side.

Further, in the vehicle door device 30 according to the present embodiment, when the rear door 32 is closed, the first and second link arms 81, 82 rotate about the first rotary coupling points X1 in the clockwise direction in FIG. 3. Accordingly, in the vehicle door device 30 according to the present embodiment, the rear door 32 supported by the first and second link arms 81, 82 is closed toward the vehicle front side.

That is, in the vehicle door device 30 according to the present embodiment, opening and closing trajectories R1 of the front door 31 are defined in a manner of drawing arc-shaped trajectories Rg based on the movement of the first link mechanism 51 formed of the first and second link arms 71, 72. Similarly, opening and closing trajectories R2 of the rear door 32 are defined in a manner of drawing the arc-shaped trajectories Rg based on the movement of the second link mechanism 52 formed of the first and second link arms 81, 82.

That is, in the vehicle door device 30 according to the present embodiment, when the doors 10, 10 supported by the link mechanisms 20, 20 approach a fully closed position P0, the first and second link arms 61, 62 extend in the vehicle front-rear direction. Accordingly, movement components of the doors 10, 10 constituting the front door 31 and the rear door 32 of the vehicle 1 in the vehicle width direction are increased.

At an intermediate opening and closing position where the first and second link arms 61 and 62 forming the link mechanisms 20, 20 extend in the vehicle width direction, the movement components of the doors 10, 10 in the vehicle front-rear direction are increased. Accordingly, the vehicle door device 30 according to the present embodiment is implemented such that, when the front door 31 and the rear door 32 of the vehicle 1 are opened and closed, a displacement amount in the vehicle width direction is reduced, thereby avoiding interference with an obstacle and securing a larger door opening amount.

Figure 4:
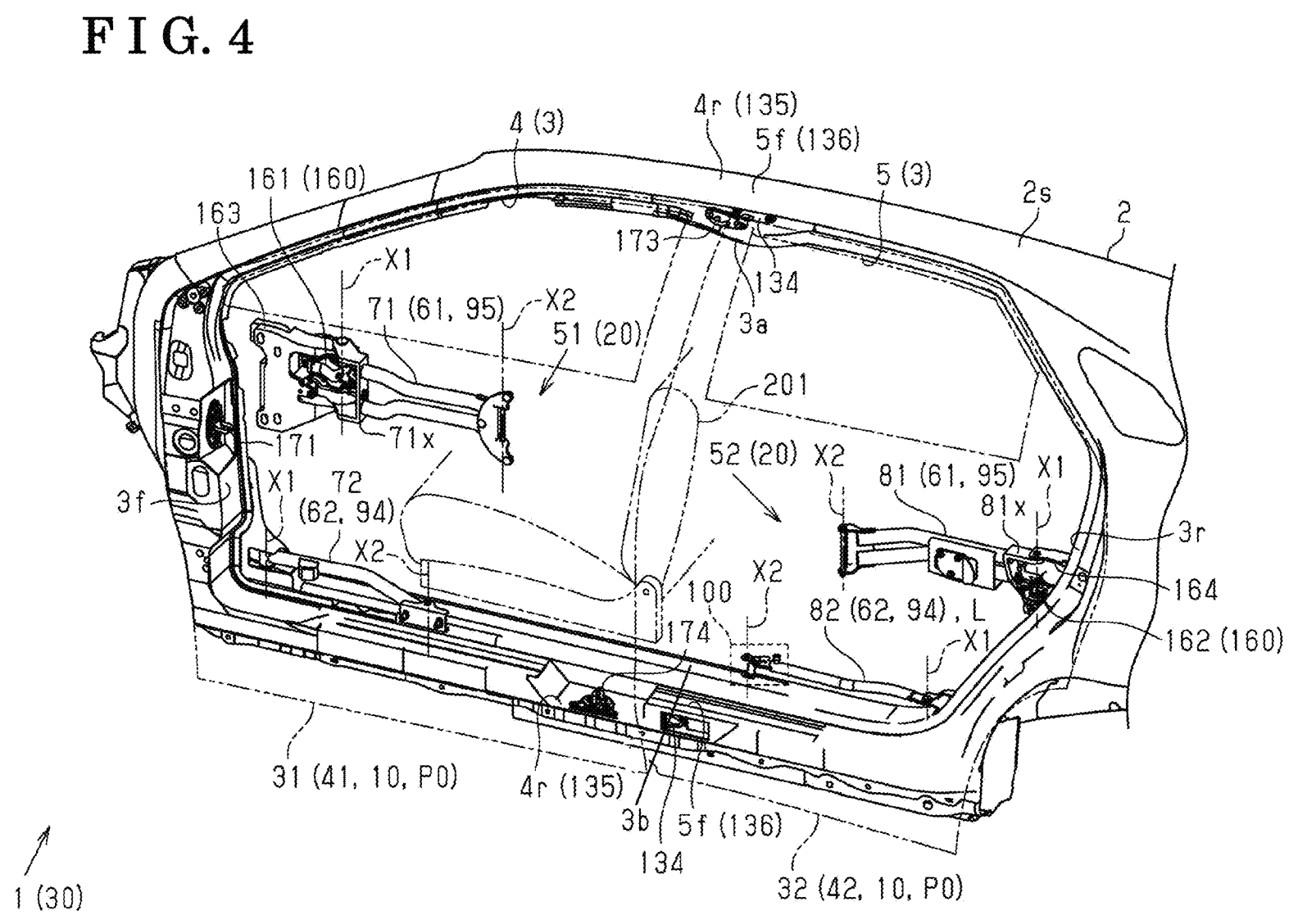

As shown in FIGS. 4 to 6, in the vehicle door device 30 according to the present embodiment, the second link mechanism 52 supporting the rear door 32 includes a coupling length variable mechanism 100 provided in the second link arm 82. Further, in the vehicle door device 30 according to the present embodiment, a coupling length L between the first and second rotary coupling points X1, X2 of the second link arm 82 on a second link mechanism 52 side can be changed based on an operation of the coupling length variable mechanism 100.

Specifically, as shown in FIGS. 5 and 6, in the vehicle door device 30 according to the present embodiment, the second link arm 82 on the second link mechanism 52 side includes a vehicle body side link 101 and a door side link 102. That is, the vehicle body side link 101 has the first rotary coupling point X1 with respect to the vehicle body 2. The door side link 102 has the second rotary coupling point X2 with respect to the rear door 32 of the vehicle 1. Further, the second link arm 82 on the second link mechanism 52 side has a configuration in which the vehicle body side link 101 and the door side link 102 are rotatably coupled to each other. In the vehicle door device 30 according to the present embodiment, a joint link mechanism 110 formed thereby functions as the coupling length variable mechanism 100.

Specifically, the door side link 102 according to the present embodiment has a configuration as a so-called mini-arm whose axial length is shorter than that of the vehicle body side link 101. The vehicle body side link 101 includes a vehicle body side coupling portion 111 with respect to the vehicle body 2 on one end side of the vehicle body side link 101 in a longitudinal direction. Further, the door side link 102 also includes a door side coupling portion 112 with respect to the door 10 on one end side of the door side link 102 in the longitudinal direction. The vehicle body side link 101 and the door side link 102 respectively have intermediate coupling portions 113, 114 coupled to each other on the other end sides in the longitudinal direction.

That is, in the vehicle door device 30 according to the present embodiment, the intermediate coupling portions 113, 114 form an intermediate coupling point X3 of the joint link mechanism 110 provided in the second link arm 82 on the second link mechanism 52 side. In the second link arm 82, the vehicle body side link 101 and the door side link 102 form a triangle with the intermediate coupling point X3 as a vertex. Accordingly, the vehicle body side link 101 and the door side link 102 rotate relative to each other. Therefore, a length of a straight line connecting the first and second rotary coupling points X1, X2 serving as a base of the triangle, that is, the coupling length L of the straight line changes.

In the vehicle door device 30 according to the present embodiment, a biasing member (not shown) applies a biasing force to the joint link mechanism 110 constituting the coupling length variable mechanism 100 to relatively rotate the vehicle body side link 101 and the door side link 102 about the intermediate coupling point X3. That is, the coupling length variable mechanism 100 according to the present embodiment is biased in a direction to shorten the coupling length L of the rear door 32 by the second link arm 82 on the second link mechanism 52 side provided with the coupling length variable mechanism 100. Accordingly, in the vehicle door device 30 according to the present embodiment, the rear door 32 is opened and closed in a state in which the coupling length L is shortened by the second link arm 82, except for a case in which the rear door 32, which will be described in detail below, is in the vicinity of the fully closed position P0.

As shown in FIGS. 4 to 7, in the vehicle door device 30 according to the present embodiment, the opening and closing trajectory R2 of the rear door 32 changes based on the operation of the coupling length variable mechanism 100 provided in the second link arm 82 on the second link mechanism 52 side. Specifically, when the rear door 32 is in the vicinity of the fully closed position P0, the opening and closing trajectory R2 of the rear door 32 changes to a linear trajectory Rs. Accordingly, the vehicle door device 30 according to the present embodiment is implemented such that the front door 31 and the rear door 32, which are independently opened and closed, do not interfere with each other based on the operations of the first and second link mechanisms 51, 52.

More specifically, in the vehicle 1 according to the present embodiment, the front door 31 is closed toward the vehicle rear side with a rear end portion 31r of the front door 31 as a closing end portion 131. The rear door 32 is closed toward the vehicle front side with a front end portion 32f of the rear door 32 as a closing end portion 132. Further, the front door 31 and the rear door 32 are disposed at the fully closed position P0 in a state in which a closing end portion tip end 131x of the front door 31 and a closing end portion tip end 132x of the rear door 32 overlap each other in the vehicle width direction.

Figure 7:
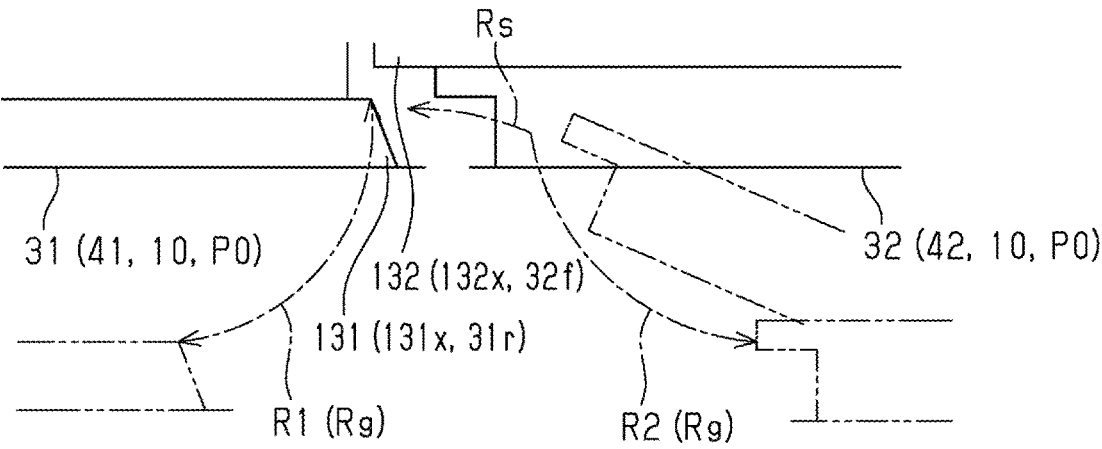
FIG. 7 is an explanatory view showing an opening and closing trajectory of the front door and the rear door in the vicinity of a fully closed position.

Specifically, in the vehicle 1 according to the present embodiment, the closing end portion tip end 132x on a rear door 32 side located at the front end portion 32f of the rear door 32 is disposed on an inner side in the vehicle width direction (an upper side in FIG. 7). The closing end portion tip end 131x on a front door 31 side located at the rear end portion 31r of the front door 31 is disposed on an outer side in the vehicle width direction (a lower side in FIG. 7) with respect to the closing end portion tip end 132x on the rear door 32 side. Therefore, when it is assumed that both of the front door 31 and the rear door 32 are opened and closed on the arc-shaped trajectory Rg based on the rotation of the first and second link arms 61, 62 even in the vicinity of the fully closed position P0, the doors 10, 10 interfere with each other.

That is, in such an assumption, when the rear door 32 located at the fully closed position P0 is opened, the front door 31 having the closing end portion tip end 131x disposed on an outer side in the vehicle width direction with respect to the closing end portion tip end 132x of the rear door 32 needs to be opened from the fully closed position P0 first. Further, when the front door 31 is fully closed, the rear door 32 needs to be in the fully closed state before the front door 31 is fully closed.

In consideration of this point, in the vehicle door device 30 according to the present embodiment, as described above, when the rear door 32 is located in the vicinity of the fully closed position P0, the opening and closing trajectory R2 of the rear door 32 changes based on the operation of the coupling length variable mechanism 100. Specifically, in the vehicle door device 30 according to the present embodiment, when the rear door 32 is fully closed, the rear door 32 moves to the fully closed position P0 in such a manner that the closing end portion tip end 132x of the rear door 32 draws the linear trajectory Rs from the vehicle rear side to the front side (from the right side to the left side in FIG. 7). When the rear door 32 is opened from the fully closed state, the rear door 32 moves from the fully closed position P0 in such a manner that the closing end portion tip end 132x of the rear door 32 similarly draws the linear trajectory Rs from the vehicle front side to the rear side (from the left side to the right side in FIG. 7). Accordingly, in the vehicle door device 30 according to the present embodiment, the front door 31 and the rear door 32 of the vehicle 1 can be opened and closed independently of each other without an order restriction when it is assumed that both of the front door 31 and the rear door 32 are opened and closed along the arc-shaped trajectory Rg as described above.

Figure 8:
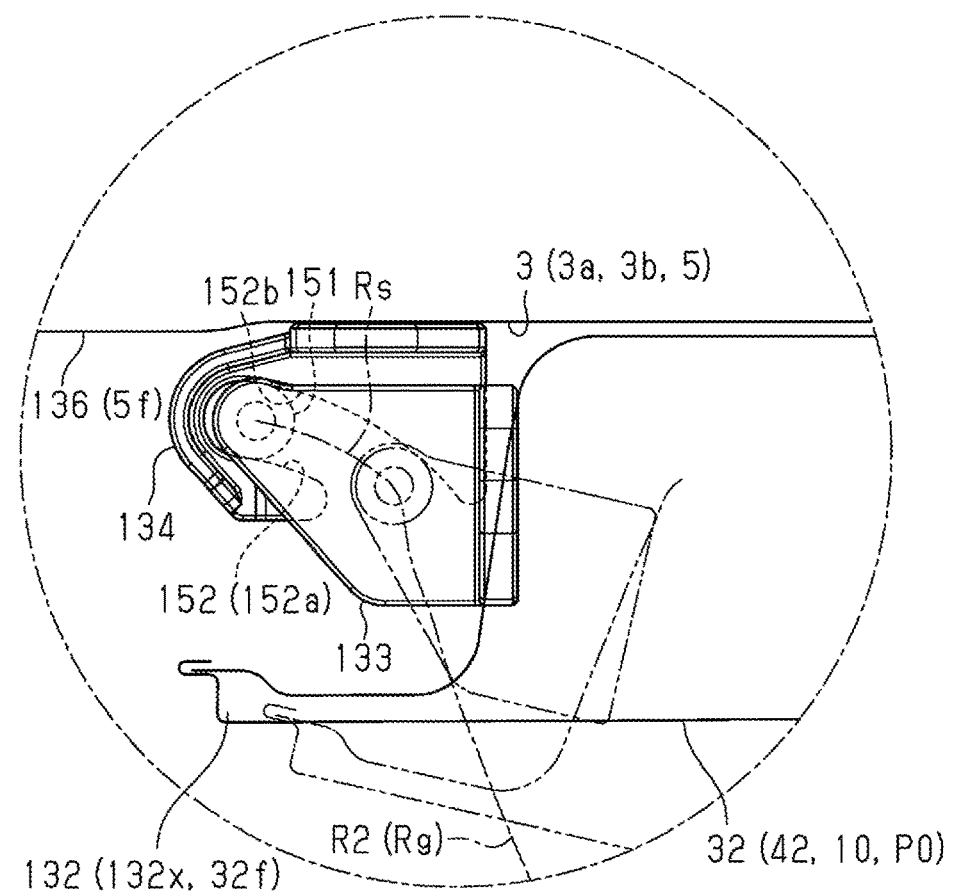
FIG. 8 is a schematic configuration diagram of a door side engagement portion and a vehicle body side engagement portion.
Figure 9:
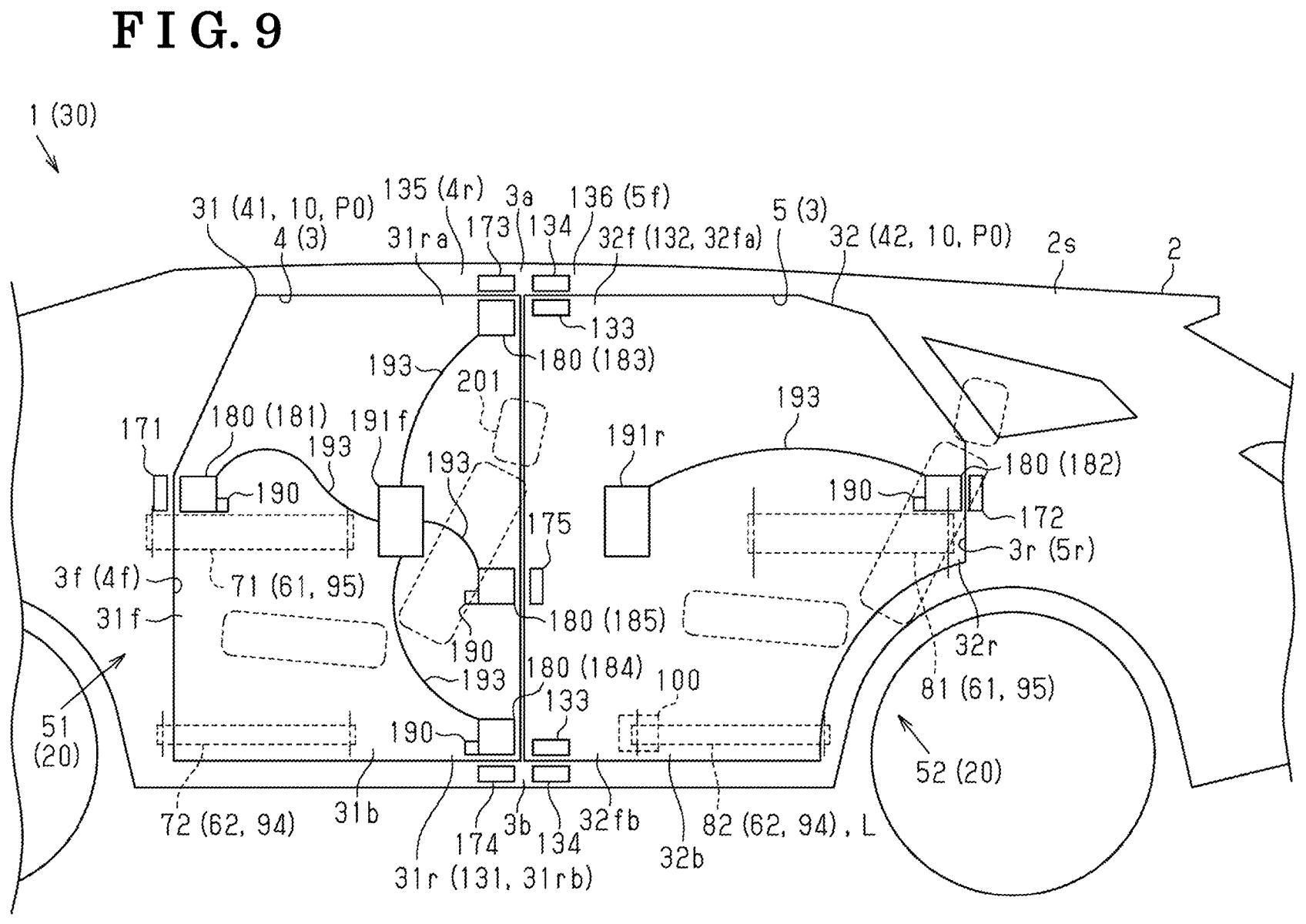

More specifically, as shown in FIGS. 4, 8, and 9, the vehicle door device 30 according to the present embodiment includes a door side engagement portion 133 provided at the closing end portion 132 of the rear door 32. The vehicle door device 30 includes a vehicle body side engagement portion 134 provided at a position corresponding to a front end 5*f* of the rear opening 5 constituting the door opening 3 of the vehicle 1, that is, at a substantially central position in the opening width direction of the door opening 3 extending in the vehicle front-rear direction. Further, in the vehicle door device 30 according to the present embodiment, when the rear door 32 is in the vicinity of the fully closed position P0, the door side engagement portion 133 and the vehicle body side engagement portion 134 are engaged with each other.

Specifically, as shown in FIGS. 4 and 9, the vehicle door device 30 according to the present embodiment includes a pair of door side engagement portions 133, 133 provided at an upper end portion 32*fa* and a lower end portion 32*fb* of the front end portion 32*f* of the rear door 32, which is the closing end portion 132 of the rear door 32. The vehicle door device 30 includes a pair of vehicle body side engagement portions 134, 134 provided at an upper edge portion 3*a* and a lower edge portion 3*b* of the door opening 3 at the substantially central position in the opening width direction of the door opening 3.

That is, in the vehicle 1 according to the present embodiment, the substantially central position in the opening width direction of the door opening 3 extending in the vehicle front-rear direction is the position of a rear end 4*r* of the front opening 4 and the front end 5*f* of the rear opening 5. Further, in the vehicle door device 30 according to the present embodiment, the substantially central position corresponds to the closing end portions 135, 136 of the door opening 3 in which the front door 31 and the rear door 32 are provided side by side in the opening width direction.

That is, the door opening 3 according to the present embodiment has the so-called pillarless structure as described above. Therefore, the vehicle door device 30 according to the present embodiment is implemented such that the vehicle body side engagement portions 134, 134 are provided at the upper edge portion 3*a* and the lower edge portion 3*b* of the door opening 3.

As shown in FIGS. 8 and 10, in the vehicle door device 30 according to the present embodiment, the door side engagement portion 133 includes a shaft-shaped engagement portion 151 that extends in an upper-lower direction (a direction orthogonal to a paper surface in FIG. 8) of the vehicle 1. Further, the vehicle body side engagement portion 134 includes a guide groove 152 having a pair of side wall portions 152*a*, 152*b* facing each other in the vehicle width direction (an upper-lower direction in FIG. 8) and extending in an opening and closing direction of the rear door 32. Further, in the vehicle door device 30 according to the present embodiment, when the rear door 32 is in the vicinity of the fully closed position P0, the door side engagement portion 133 and the vehicle body side engagement portion 134 are engaged with each other in a state in which the shaft-shaped engagement portion 151 is disposed in the guide groove 152.

That is, the shaft-shaped engagement portion 151 of the door side engagement portion 133 is disposed in the guide groove 152 of the vehicle body side engagement portion 134, in a state of being sandwiched between the pair of side wall portions 152*a*, 152*b* facing each other in the vehicle width direction. Therefore, the displacement of the rear door 32 in the vehicle width direction is restricted. Accordingly, the vehicle door device 30 according to the present embodiment can stably support the rear door 32 even in the vicinity of the fully closed position P0 where the first and second link arms 81, 82 forming the second link mechanism 52 are likely to be aligned.

Further, in the vehicle door device 30 according to the present embodiment, the opening and closing of the rear door 32 in the state in which the door side engagement portion 133 and the vehicle body side engagement portion 134 are engaged with each other is allowed based on the operation of the coupling length variable mechanism 100 provided in the second link arm 82. Specifically, when the rear door 32 is opened and closed in the state in which the door side engagement portion 133 and the vehicle body side engagement portion 134 are engaged with each other, the shaft-shaped engagement portion 151 is relatively displaced along an extending direction of the guide groove 152 while the coupling length L is changed based on the operation of the coupling length variable mechanism 100. Accordingly, in the vehicle door device 30 according to the present embodiment, the opening and closing trajectory R2 of the rear door 32 changes. That is, the arc-shaped trajectory Rg based on the operation of the second link mechanism 52 is changed to the linear trajectory Rs along the opening width direction of the door opening 3.

In the vehicle door device 30 according to the present embodiment, on a first link mechanism 51 side supporting the front door 31 of the vehicle 1, the coupling length variable mechanism 100 is not provided in any of the first and second link arms 71, 72. That is, in the vehicle door device 30 according to the present embodiment, even when the front door 31 is in the vicinity of the fully closed position P0, the front door 31 is opened and closed while drawing the arc-shaped trajectory Rg based on the rotation of the first and second link arms 71, 72. Accordingly, in the vehicle 1 according to the present embodiment, the front door 31 located in the vicinity of the fully closed position P0 is opened and closed in a manner of being displaced in the vehicle width direction.

That is, when the front door 31 is opened from the fully closed position P0, the rear end portion 31*r*, which is the closing end portion 131 of the front door 31, is displaced in the outer side in the vehicle width direction while being displaced toward the vehicle front side. On the other hand, when the front door 31 is closed to the fully closed position P0, the rear end portion 31*r*, which serves as the closing end portion 131 of the front door 31, is displaced in the inner side in the vehicle width direction while being displaced toward the vehicle rear side. Accordingly, the vehicle door device 30 according to the present embodiment can open the front door 31 of the vehicle 1 from the fully closed position P0 and close the front door 31 to the fully closed position P0 with an operation feeling similar to that of a general swing door.

As shown in FIGS. 1 to 4, the vehicle door device 30 according to the present embodiment has a configuration as a so-called power door device capable of opening and closing the front door 31 and the rear door 32 of the vehicle 1 based on a driving force of an actuator 160.

Specifically, the vehicle door device 30 according to the present embodiment includes a first actuator 161 that applies the driving force to the first link mechanism 51 to open and close the first door 41 supported by the first link mechanism 51. The vehicle door device 30 further includes a second actuator 162 that applies the driving force to the second link mechanism 52 to open and close the second door 42 supported by the second link mechanism 52. In the vehicle door device 30 according to the present embodiment, the front door 31 serving as the first door 41 and the rear door 32 serving as the second door 42 are independently opened and closed by operations of the first and second actuators 161, 162.

Specifically, the first and second actuators 161, 162 each have a motor serving as a drive source thereof. The first and second actuators 161, 162 are provided at the first rotary coupling points X1, X1 of the first link arms 71, 81, respectively, in the corresponding first and second link mechanisms 51, 52.

Specifically, the first actuator 161 is provided at a base end portion 71x of the first link arm 71 having the first rotary coupling point X1 with respect to the vehicle body 2 in a state in which the first actuator 161 is fixed to the vehicle body 2. Specifically, the first actuator 161 is provided at a position where the base end portion 71x of the first link arm 71 and a coupling bracket 163 that allows the base end portion 71x to rotate with respect to the vehicle body 2 are coupled. Accordingly, the first actuator 161 is implemented such that a driving force for rotating the first link arm 71 on the first link mechanism 51 side about the first rotary coupling point X1 with respect to the vehicle body 2 is applied.

Similarly, the second actuator 162 is also provided at a base end portion 81x of the first link arm 81 having the first rotary coupling point X1 with respect to the vehicle body 2 in a state in which the second actuator 162 is fixed to the vehicle body 2. Specifically, the second actuator 162 is provided at a position where the base end portion 81x of the first link arm 81 and a coupling bracket 164 that allows the base end portion 81x to rotate with respect to the vehicle body 2 are coupled. Accordingly, in the second actuator 162, a driving force for rotating the first link arm 81 on the second link mechanism 52 side about the first rotary coupling point X1 with respect to the vehicle body 2 is applied.

Further, in the vehicle door device 30 according to the present embodiment, independent control signals are input to the first and second actuators 161, 162, respectively. Accordingly, in the vehicle 1 according to the present embodiment, the front door 31 supported by the first link mechanism 51 and the rear door 32 serving as the second door 42 supported by the second link mechanism 52 are opened and closed independently of each other.

Door Lock System

Next, a door lock system of the vehicle 1 formed of the vehicle door device 30 according to the present embodiment will be described.

As shown in FIGS. 4, 9, and 10, the vehicle door device 30 according to the present embodiment includes strikers 171, 172 provided at the front edge portion 3f and the rear edge portion 3r of the door opening 3. The vehicle door device 30 includes a pair of upper and lower strikers 173, 174 separately provided at the upper edge portion 3a and the lower edge portion 3b of the door opening 3 at the substantially central position in the opening width direction of the door opening 3. Specifically, the strikers 173, 174 are provided at the closing end portion 135 of the door opening 3 where the front door 31 is disposed. The vehicle door device 30 further includes a striker 175 provided at the front end portion 32f of the rear door 32. Accordingly, the vehicle door device 30 according to the present embodiment includes a plurality of lock devices 180 that engage with the strikers 171 to 175 to restrain the front door 31 and the rear door 32 that are provided in the door opening 3 at the fully closed position P0.

Specifically, as shown in FIG. 9, the vehicle door device 30 according to the present embodiment includes, as the lock device 180, a front lock 181 provided at a front end portion 31f of the front door 31. Similarly, the vehicle door device 30 includes, as the lock device 180, a rear lock 182 provided at a rear end portion 32r of the rear door 32. Further, the vehicle door device 30 includes, as the lock devices 180, an upper lock 183 provided at an upper end portion 31ra of the rear end portion 31r of the front door 31, and a lower lock 184 provided at a lower end portion 31rb of the rear end portion 31r of the front door 31. The vehicle door device 30 according to the present embodiment includes, as the lock device 180, a center lock 185 provided at the rear end portion 31r of the front door 31 at a position in the upper-lower direction between the upper lock 183 and the lower lock 184.

That is, in the vehicle 1 according to the present embodiment, when the front door 31 is closed to the fully closed position P0, the lock devices 180 provided at the front door 31 are engaged with the corresponding strikers 171, 173, 174. Specifically, the front lock 181 provided at the front end portion 31f of the front door 31 is engaged with the striker 171 provided at the front edge portion 3f of the door opening 3, that is, at a position corresponding to a front end 4f of the front opening 4. The upper lock 183 and the lower lock 184 provided at the rear end portion 31r of the front door 31 separately engage with the upper and lower strikers 173, 174 provided at the upper edge portion 3a and the lower edge portion 3b of the door opening 3 at positions corresponding to the rear end 4r of the front opening 4. In the vehicle 1 according to the present embodiment, the strikers 173, 174 are similarly disposed on the vehicle front side of the vehicle body side engagement portions 134, 134 provided on the upper edge portion 3a and the lower edge portion 3b of the door opening 3. Further, in the vehicle 1 according to the present embodiment, the front door 31 is held in the fully closed state based on an engagement force between the strikers 171, 173, 174 and the front lock 181, the upper lock 183, and the lower lock 184.

When the rear door 32 is closed to the fully closed position P0, the rear lock 182 provided at the rear end portion 32r of the rear door 32 is engaged with the striker 172 provided at the rear edge portion 3r of the door opening 3, that is, at a position corresponding to a rear end 5r of the rear opening 5. Further, in the vehicle 1 according to the present embodiment, the rear door 32 is held in the fully closed state based on an engagement force of the rear lock 182 and the striker 172 and an engagement force of the door side engagement portions 133, 133 and the vehicle body side engagement portions 134, 134.

Further, in the vehicle 1 according to the present embodiment, when both the front door 31 and the rear door 32 are in the fully closed state, the center lock 185 provided in the front door 31 is engaged with the striker 175 provided in the rear door 32. That is, the lock device 180 provided at the closing end portion 131 of the front door 31 engages with the striker 175 provided at the closing end portion 132 of the rear door 32. Accordingly, the vehicle 1 according to the present embodiment is implemented such that the front door 31 and the rear door 32 are restrained at the fully closed position P0 based on an engagement force of the center lock 185 and the striker 175.

More specifically, in the vehicle door device 30 according to the present embodiment, the lock devices 180 each include a latch mechanism (not shown) that has two engagement states which are a half-latched state and a full-latched state. Each of the lock devices 180 other than the upper lock 183 includes a motor 190 serving as a drive source. That is, each of the lock devices 180 has a function of shifting the latch mechanism from the half-latched state to the full-latched state and shifting the latch mechanism from the full-latched state to an unlatched state, that is, a non-engaged state, by motor driving. Further, the vehicle door device 30 according to the present embodiment is implemented such that the lower lock 184 and the upper lock 183 having the drive source thereof are interlocked with each other by cable coupling via a remote controller 191f. Further, the vehicle door device 30 according to the present embodiment releases, by the operation of the lock devices 180, the restraint of the front door 31 and the rear door 32 in response to an opening request when the door is opened from the fully closed position P0.

Specifically, in the vehicle 1 according to the present embodiment, a control signal for each lock device 180 having the motor 190 serving as the drive source is individually input via an in-vehicle network (not shown).

For example, when an opening request of the rear door 32 is made based on an operation input to an operation switch provided in the vehicle 1 or a portable device held by a user, a lock release signal is input to the lock device 180 provided in the rear door 32, that is, the rear lock 182. At this time, the lock release signal is also input to the lock device 180 that engages with the striker 175 provided at the front end portion 32f of the rear door 32, that is, the center lock 185, among the lock devices 180 provided at the rear end portion 31r of the front door 31. Accordingly, the vehicle door device 30 according to the present embodiment is implemented such that the rear lock 182 and the center lock 185 perform an unlock operation, thereby allowing the opening of the rear door 32 in the fully closed state.

On the other hand, when an opening request of the front door 31 is made, the lock release signal is input to the lock devices 180 with the drive source provided in the front door 31, that is, the front lock 181, the lower lock 184, and the center lock 185. Accordingly, the vehicle door device 30 according to the present embodiment is implemented such that the three lock devices 180 perform the unlock operation, and the upper lock 183 is interlocked to perform the unlock operation, thereby allowing the opening of the front door 31 in the fully closed state.

In the vehicle door device 30 according to the present embodiment, in addition to the upper lock 183 and the lower lock 184, the front lock 181 and the center lock 185 are also coupled to the remote controller 191f provided on the front door 31 via a transmission cable 193. Similarly, the rear lock 182 on the rear door 32 side is coupled to a remote controller 191r provided on the rear door 32 via a transmission cable 193. Accordingly, the vehicle door device 30 according to the present embodiment is implemented such that each of the lock devices 180 performs the unlock operation based on an operation of the remote controllers 191f, 191r coupled via the transmission cable 193 without depending on the motor driving.

Specifically, the vehicle 1 according to the present embodiment includes emergency levers (not shown) provided on the front door 31 and the rear door 32. In the vehicle door device 30 according to the present embodiment, operation inputs to the emergency levers are separately input to the remote controller 191f on the front door 31 side and the remote controller 191r on the rear door 32 side on which the respective emergency levers are provided. That is, in the vehicle 1 according to the present embodiment, the emergency levers are operated at, for example, the time of power loss such as so-called battery exhaustion. Further, the operation inputs to the emergency levers are separately transmitted to the lock devices 180 provided in the front door 31 and the rear door 32 via the corresponding remote controllers 191f, 191r. Accordingly, the vehicle door device 30 according to the present embodiment can manually release the restraint of the front door 31 and the rear door 32 that are held in the fully closed state.

Front Door and First Link Mechanism

Next, the first link mechanism 51 supporting the front door 31 of the vehicle 1 will be described.

As shown in FIGS. 4 and 11 to 13, in the vehicle 1 according to the present embodiment, the first door 41 constituting the front door 31 of the vehicle 1 is disposed in the front opening 4 of the door opening 3 while being supported by the first link mechanism 51. Accordingly, the vehicle door device 30 according to the present embodiment is implemented such that the front door 31 is opened and closed on the outer side in the vehicle width direction of a front seat 201 provided in a vehicle interior 200 based on the operation of the first link mechanism 51.

That is, as described above, the first and second link arms 71, 72 forming the first link mechanism 51 each have the first rotary coupling point X1 rotatably coupled to the vehicle body 2 in the vicinity of the front edge portion 3f of the door opening 3.

Specifically, as shown in FIGS. 11 to 14, the vehicle 1 according to the present embodiment includes a front portion 200f of the vehicle interior 200 and a dash panel 210 provided at a position in front of a front seat 201 of the front portion 200f. Further, in the vehicle door device 30 according to the present embodiment, the first link arm 71 constituting the main link 95 of the first link mechanism 51 has the first rotary coupling point X1 with respect to the vehicle body 2 inside the dash panel 210. Specifically, in the vehicle door device 30 according to the present embodiment, the base end portion 71x of the first link arm 71 and the coupling bracket 163 forming the first rotary coupling point X1 with respect to the vehicle body 2 are disposed inside the dash panel 210. Accordingly, in the vehicle door device 30 according to the present embodiment, the first link arm 71 rotates in a state in which the first rotary coupling point X1 and the first actuator 161 provided at the first rotary coupling point X1 are hidden in the dash panel 210. That is, the front door 31 of the vehicle 1 coupled to the first link arm 71 is opened and closed.

The vehicle door device 30 according to the present embodiment includes a link cover 220 that rotates together with the first link arm 71 in a state of covering the first link arm 71 constituting the first link mechanism 51. In the vehicle door device 30 according to the present embodiment, the link cover 220 is implemented using a soft material, such as resin or sponge, similar to a door trim constituting an inner side surface 31s of the front door 31. The link cover 220 according to the present embodiment covers an outer periphery of the first link arm 71 over the entire length of the first link arm 71 from the first rotary coupling point X1 with respect to the vehicle body 2 to the second rotary coupling point X2 with respect to the front door 31. Further, in the vehicle door device 30 according to the present embodiment, when the front door 31 is in the fully closed state, the link cover 220 is continuously and integrally disposed with the inner side surface 31s of the front door 31 and the dash panel 210.

Figure 14:
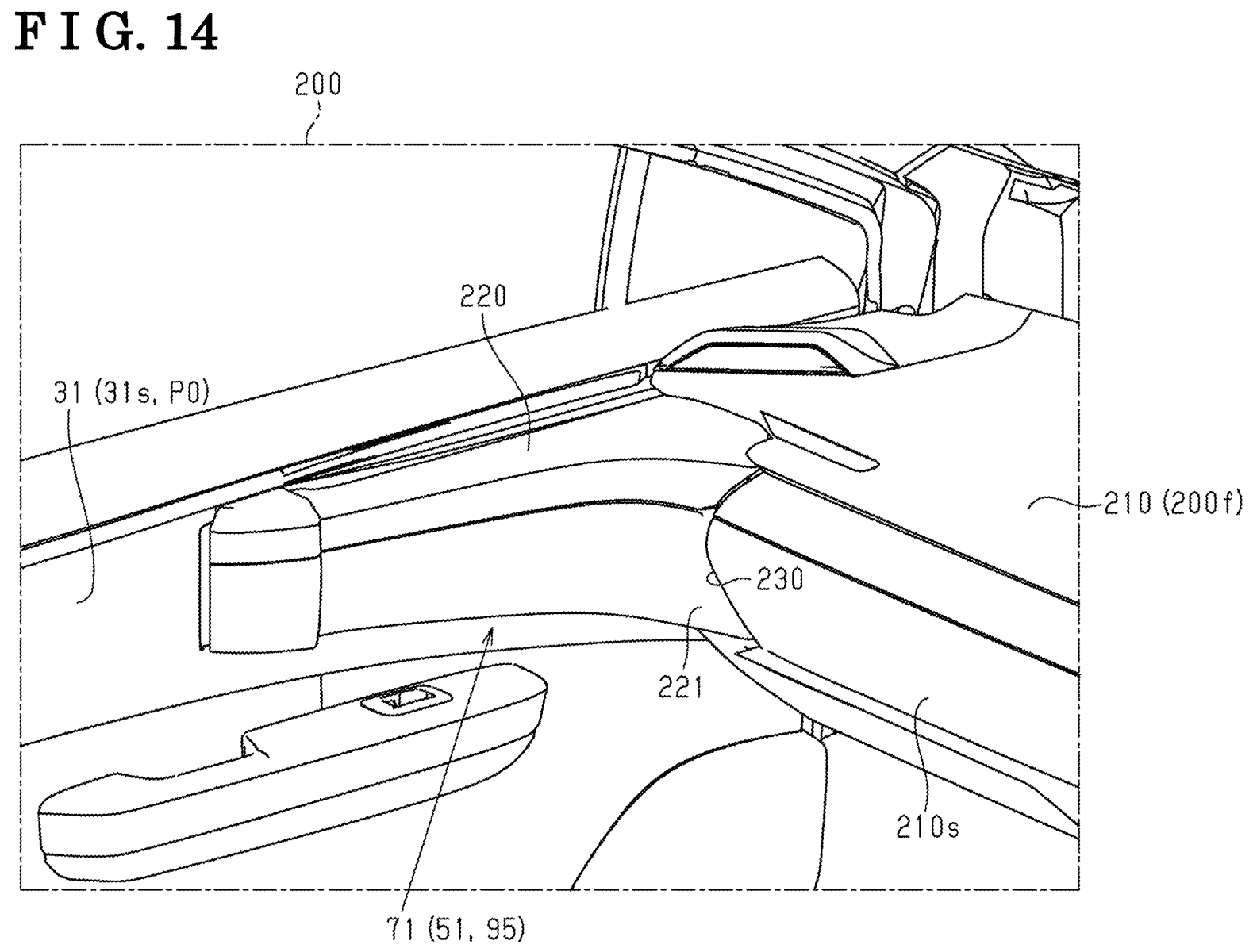

That is, as shown in FIGS. 13 and 14, in the vehicle door device 30 according to the present embodiment, when the front door 31 is in the fully closed state, the first and second link arms 71, 72 of the first link mechanism 51 supporting the front door 31 extend in the vehicle front-rear direction. Accordingly, the link cover 220 covering the first link arm 71 is disposed along the inner side surface 31s of the front door 31. In this state, the link cover 220 according to the present embodiment is designed to be integrated with the inner side surface 31s of the front door 31.

Further, in the link cover 220 according to the present embodiment, a portion covering the base end portion 71x of the first link arm 71 having the first rotary coupling point X1 with respect to the vehicle body 2 has a substantially L-shaped curved shape. Accordingly, the vehicle door device 30 according to the present embodiment is implemented such that, when the front door 31 is in the fully closed state, a base end portion 221 of the link cover 220 is continuously disposed on a design surface 210s of the dash panel 210 extending in the vehicle width direction.

As shown in FIGS. 12 and 14, the vehicle door device 30 according to the present embodiment includes a cover member 240 provided in a gap 230 formed between the link cover 220 and the dash panel 210 when the front door 31 is opened.

That is, in the vehicle door device 30 according to the present embodiment, the first link mechanism 51 is in a state in which the first and second link arms 71, 72 extend in the vehicle width direction by the opening of the front door 31. Accordingly, a base end portion 221 side of the link cover 220, which has the substantially L-shaped curved shape and is continuous with the design surface 210s of the dash panel 210, faces the vehicle rear side. Accordingly, the gap 230 between the link cover 220 and the dash panel 210 is enlarged.

In view of this point, in the vehicle door device 30 according to the present embodiment, the cover member 240 disposed in the gap 230 covers the base end portion 71x of the first link arm 71 and the first actuator 161 disposed in the dash panel 210. That is, the cover member 240 hides the base end portion 71x of the first link arm 71 and the first actuator 161 facing a vehicle interior 200 side from the gap 230 between the link cover 220 and the dash panel 210. Accordingly, in the vehicle door device 30 according to the present embodiment, high design characteristics are secured.

As shown in FIGS. 11 to 13 and 15, in the vehicle 1 according to the present embodiment, a lower side of the dash panel 210 is a foot space 250 of an occupant seated on the front seat 201. Further, an interior member 251 that covers an inner side surface (not shown) of the vehicle body 2 that forms a wall surface of the vehicle interior 200 is provided at a position on a side of the foot space 250 formed below the dash panel 210 and on an outer side in the vehicle width direction. The interior member 251 may be referred to as "foot scuff", for example. In the vehicle door device 30 according to the present embodiment, the second link arm 72 constituting the sub-link 94 of the first link mechanism 51 has the first rotary coupling point X1 with respect to the vehicle body 2 inside the interior member 251 disposed on the side of the foot space 250. Specifically, in the vehicle door device 30 according to the present embodiment, the base end portion 72x of the second link arm 72 and a coupling bracket 252 forming the first rotary coupling point X1 are disposed inside the dash panel 210.

That is, in the vehicle 1 according to the present embodiment, due to the arrangement, the base end portion 72x of the second link arm 72 having the first rotary coupling point X1 with respect to the vehicle body 2 is difficult to be seen by the occupant of the vehicle 1. Accordingly, in the vehicle door device 30, high design characteristics are secured.

Figure 16:
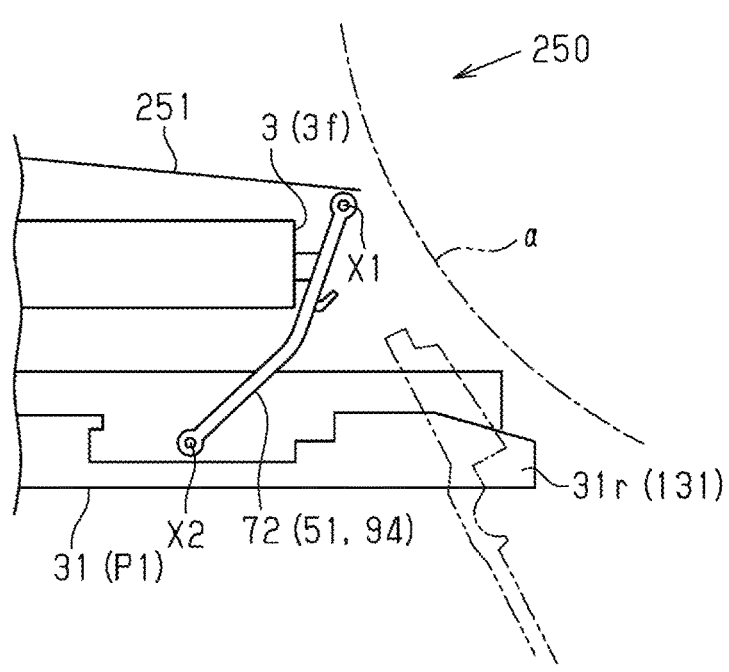
FIG. 16 is an explanatory view showing getting-on-and-off performance of the front door that opens toward the front of the vehicle.

As shown in FIG. 16, in the vehicle door device 30 according to the present embodiment, due to the arrangement of the first rotary coupling point X1 with respect to the vehicle body 2, the front door 31 supported by the second link arm 72 is less likely to interfere with getting on and off through the door opening 3.

That is, the second link arm 72 supporting the lower end portion 31b of the front door 31 operates at a height overlapping a flow line of the feet of the occupant on the front seat 201 when the occupant gets on and off the vehicle. In FIG. 16, a dashed-dotted line a indicates a flow line of the feet of the occupant seated on the front seat 201, specifically, a flow line of heels of the occupant when the occupant gets on and off the vehicle. However, in the vehicle door device 30 according to the present embodiment, in a state in which the front door 31 is in a fully opened position P1, the second link arm 72 supporting the front door 31 is disposed at a position deviated from the flow line of the occupant who gets on and off the vehicle 1. Further, as for a door opening amount of the front door 31 in the fully open state, substantially the same door opening amount is secured as in the case of using a general swing door indicated by a virtual line in FIG. 16. Accordingly, in the vehicle door device 30 according to the present embodiment, the front opening 4 of the door opening 3 in which the front door 31 is provided is capable of securing good getting-on-and-off performance.

Figure 17:
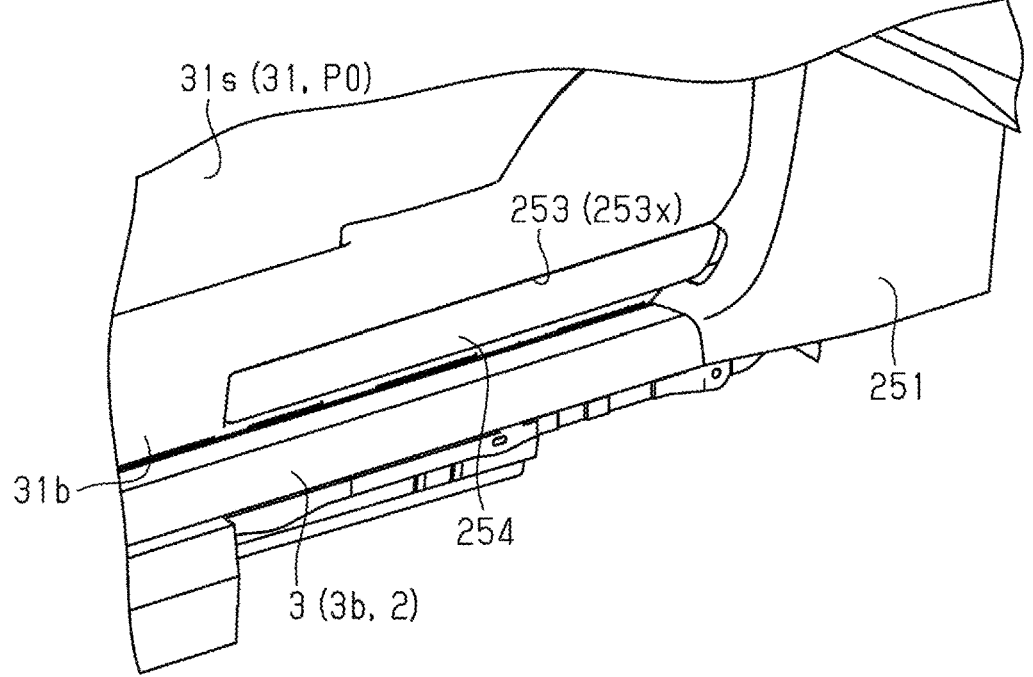
FIG. 17 is an external view of the vicinity of an accommodation recess of the second link arm provided in the front door and a lid member that covers an opening of the accommodation recess.

As shown in FIGS. 13, 15, and 17, in the vehicle 1 according to the present embodiment, an accommodation recess 253 for accommodating the second link arm 72 therein when the front door 31 is closed is formed in the inner side surface 31s of the front door 31. The vehicle door device 30 according to the present embodiment includes a lid member 254 that covers an opening 253x in a state in which the second link arm 72 is accommodated in the accommodation recess 253.

Specifically, the accommodation recess 253 according to the present embodiment has a groove shape extending in the vehicle front-rear direction in the vicinity of the lower end portion 31b of the front door 31. Further, the lid member 254 has a rotary shaft (not shown) at a position above the accommodation recess 253. That is, in the vehicle door device 30 according to the present embodiment, the second link arm 72 is detached from the accommodation recess 253 in a manner of pushing up the lid member 254 when the front door 31 is opened (see FIG. 15). When the front door 31 is closed, the lid member 254 is rotated by an own weight thereof and thereby returned to the position where the lid member 254 covers the opening 253x of the accommodation recess 253 for accommodating the second link arm 72 therein. Accordingly, the vehicle door device 30 according to the present embodiment is implemented such that, when the front door 31 is in the fully closed state, it is difficult for the occupant in the vehicle interior 200 to visually recognize the second link arm 72 forming the first link mechanism 51.

Next, an operation according to the present embodiment will be described.

That is, the first and second link arms 71, 72 constituting the first link mechanism 51 each have the first rotary coupling point X1 rotatably coupled to the vehicle body 2 in the vicinity of the front edge portion 3f of the door opening 3. The first and second link arms 71, 72 each have the second rotary coupling point X2 rotatably coupled to the first door 41 constituting the front door 31 of the vehicle 1. When the first and second link arms 71, 72 rotate about the first rotary coupling points X1, the front door 31 supported by the first and second link arms 71, 72 is opened toward the vehicle front side.

Next, effects according to the present embodiment will be described.

(1) The first door 41 constituting the front door 31 of the vehicle 1 is supported by the first link mechanism 51, so that the first door 41 is opened toward the vehicle front side based on the operation of the first link mechanism 51. Further, the first link arm 71 constituting the first link mechanism 51 has the first rotary coupling point X1 with respect to the vehicle body 2 inside the dash panel 210 provided at the front portion 200f of the vehicle interior 200.

That is, with respect to the first link arm 71 supporting the front door 31 opened toward the vehicle front side on the vehicle body 2, the base end portion 71x side having the first rotary coupling point X1 with respect to the vehicle body 2 is disposed on a front portion 200f side of the vehicle interior 200. Therefore, the base end portion side is easily visually recognized by the occupant in the vehicle interior 200. However, according to the above configuration, the base end portion 71x side of the first link arm 71 having the first rotary coupling point X1 can be hidden from the occupant in the vehicle interior 200. Accordingly, it is possible to secure high design characteristics suitable for the front door 31 of the vehicle 1.

In many cases, the vehicle door including the front door 31 has a center of gravity in the vicinity of a belt line below the window. Normally, an upper end portion of the dash panel 210, that is, a dashboard, is also disposed at a height in the vicinity of the belt line. Therefore, according to the above configuration, a load of the front door 31 can be stably supported by the first link arm 71 in which the first rotary coupling point X1 with respect to the vehicle body 2 is provided inside the dash panel 210. It is possible to secure high support rigidity of the front door 31 without requiring special reinforcement on a vehicle body 2 side. Accordingly, it is possible to secure high adaptability to the front door 31 of the vehicle 1.

(2) The vehicle door device 30 includes the link cover 220 that rotates together with the first link arm 71 in a state of covering the first link arm 71. Accordingly, it is possible to secure the high design characteristics suitable for the front door 31 of the vehicle 1.

(3) When the front door 31 is in the fully closed state, the link cover 220 is disposed continuously and integrally with the inner side surface 31s of the front door 31 and the dash panel 210. Accordingly, it is possible to secure the high design characteristics more suitable for the front door 31 of the vehicle 1.

(4) The vehicle door device 30 includes the cover member 240 provided in the gap 230 formed between the link cover 220 and the dash panel 210 when the front door 31 is opened.

According to the above configuration, the base end portion 71x of the first link arm 71 facing the vehicle interior 200 side from the gap 230 between the link cover 220 and the dash panel 210 can be hidden by the cover member 240. Accordingly, it is possible to secure the high design characteristics suitable for the front door 31 of the vehicle 1.

(5) The second link arm 72 supporting the front door 31 together with the first link arm 71 has the first rotary coupling point X1 with respect to the vehicle body 2 inside the interior member 251 that is located at the outer side of the foot space 250 in the vehicle width direction. The foot space 250 is formed below the dash panel 210.

According to the above configuration, the base end portion 72x of the second link arm 72 having the first rotary coupling point X1 with respect to the vehicle body 2 can be disposed at a position that is difficult to be seen by the occupant in the vehicle interior 200. Accordingly, it is possible to secure high design characteristics suitable for the front door 31 of the vehicle 1.

In a state in which the front door 31 is in the fully opened position P1, the second link arm 72 supporting the front door 31 can be disposed at a position deviated from the flow line of the occupant who gets on and off the vehicle 1. Further, a large door opening amount can be set for the front door 31. Accordingly, it is possible to secure good getting-on-and-off performance suitable for the front door 31.

In addition, a large separation distance can be set between the first and second link arms 71, 72 in the upper-lower direction of the vehicle 1. Therefore, according to the above configuration, the first link mechanism 51 formed of the first and second link arms 71, 72 can stably support the load of the front door 31. It is possible to secure high support rigidity of the front door 31 without requiring special reinforcement on a vehicle body 2 side. Accordingly, it is possible to secure high adaptability to the front door 31 of the vehicle 1.

(6) The inner side surface 31s of the front door 31 has the accommodation recess 253 for accommodating the second link arm 72 therein when the front door 31 is in the fully closed state. The vehicle door device 30 includes the lid member 254 that covers the opening 253x in a state in which the second link arm 72 is accommodated in the accommodation recess 253.

According to the above configuration, when the front door 31 is in the fully closed state, it is difficult for the occupant in the vehicle interior 200 to visually recognize the second link arm 72. Accordingly, it is possible to secure high design characteristics suitable for the front door 31 of the vehicle 1.

(7) The vehicle door device 30 includes the first actuator 161 that applies the driving force to the first link mechanism 51 supporting the front door 31 to open and close the front door 31. The first actuator 161 is provided inside the dash panel 210.

According to the above configuration, the first link arm 71 constituting the first link mechanism 51 can be rotated about the first rotary coupling point X1 based on the driving force of the first actuator 161. Accordingly, the front door 31 supported by the first link mechanism 51 can be stably opened and closed.

Further, the first actuator 161 disposed on the front portion 200f side of the vehicle interior 200 together with the base end portion 71x of the first link arm 71 having the first rotary coupling point X1 can be hidden from the occupant in the vehicle interior 200. Accordingly, it is possible to secure high design characteristics suitable for the front door 31 of the vehicle 1. In addition, there is an advantage that wiring for the first actuator 161 can be facilitated.

The above embodiment can be modified and implemented as follows. The above embodiment and the following modifications can be implemented in combination with each other within a technically consistent range.

In the above embodiment, the second link arm 72 supporting the front door 31 has the first rotary coupling point X1 with respect to the vehicle body 2 inside the interior member 251 located on the outer side of the foot space 250 in the vehicle width direction. The foot space 250 is formed below the dash panel 210. However, the embodiment disclosed here is not limited thereto. The second link arm 72 may have the first rotary coupling point X1 with respect to the vehicle body 2 at the lower edge portion 3b of the door opening 3 in which the front door 31 is provided.

Figure 18:
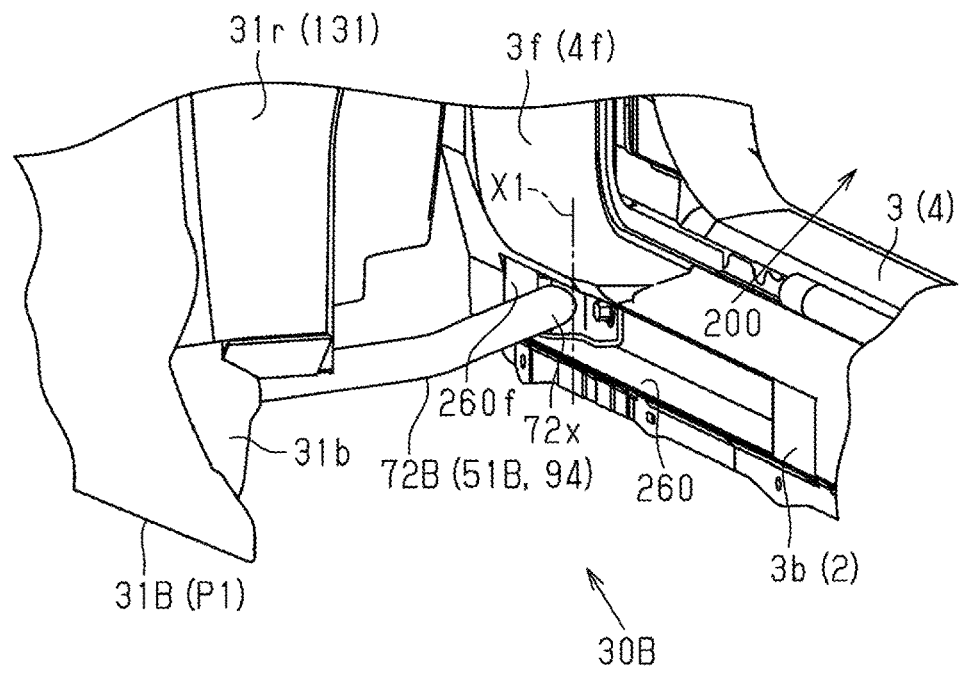
FIG. 18 is a perspective view showing an arrangement of a second link arm in another example.
Figure 19:
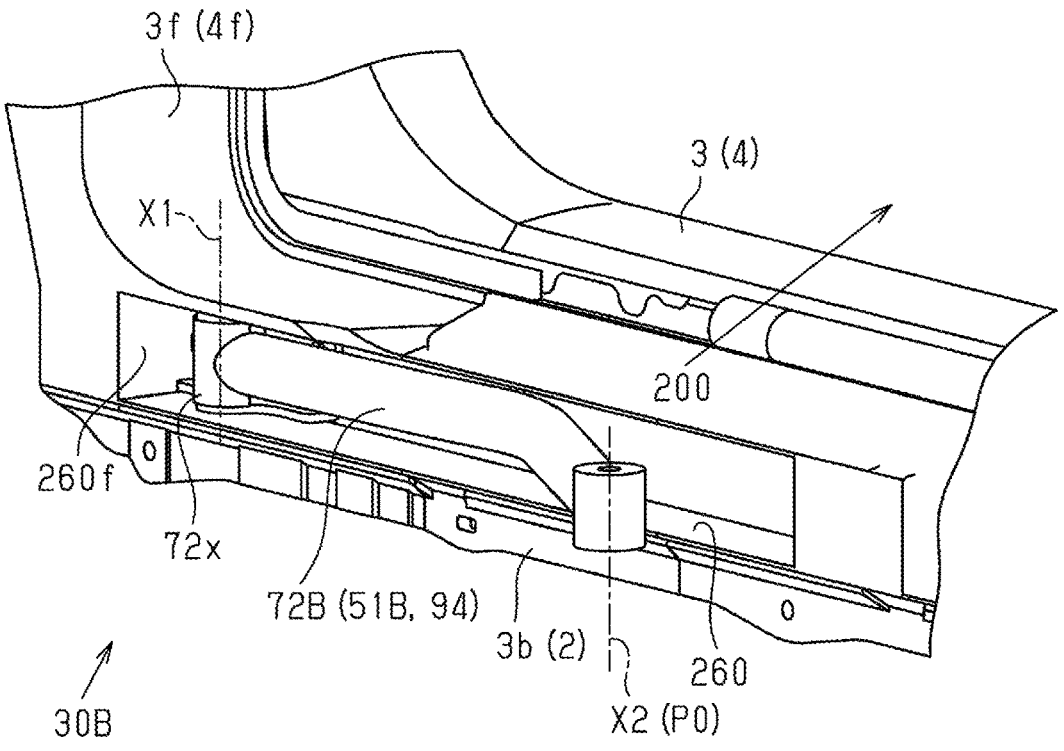
FIG. 19 is a perspective view showing an arrangement of the second link arm in the other example.

For example, in another example shown in FIGS. 18 and 19, a groove-shaped recess 260 extending in the vehicle front-rear direction in a state of being opened to the outer side in the vehicle width direction is formed in the lower edge portion 3*b* of the door opening 3 in which a front door 31B is provided. Further, a second link arm 72B supporting the front door 31B of the vehicle 1 on the vehicle body 2 by forming a first link mechanism 51B together with the first link arm 71 (not shown) has the first rotary coupling point X1 provided at a front end portion 260*f* of the recess 260. Accordingly, a vehicle door device 30B in the other example is implemented such that, when the front door 31B is in the fully closed state, the second link arm 72B is accommodated inside the recess 260.

That is, even when such a configuration is adopted, the base end portion 72*x* of the second link arm 72B having the first rotary coupling point X1 with respect to the vehicle body 2 can be disposed at a position that is difficult to be seen by the occupant in the vehicle interior 200. In a state in which the front door 31B is in the fully opened position P1, the second link arm 72B supporting the front door 31B can be disposed at a position deviated from the flow line of the occupant who gets on and off the vehicle 1. Further, a large door opening amount can be set for the front door 31. Accordingly, it is possible to secure high design characteristics and good getting-on-and-off performance suitable for the front door 31B of the vehicle 1.

By setting the large separation distance between the first and second link arms 71, 72B forming the first link mechanism 51B, it is possible to stably support the load of the front door 31B. Further, it is possible to secure high support rigidity of the front door 31B without requiring special reinforcement on a vehicle body 2 side.

In the above embodiment, the link cover 220 that rotates together with the first link arm 71 in a state of covering the first link arm 71 is provided. Further, when the front door 31 is in the fully closed state, the link cover 220 is disposed continuously and integrally with the inner side surface 31*s* of the front door 31 and the dash panel 210. However, the embodiment disclosed here is not limited thereto. For example, a so-called blindfold structure and a protection structure of the first link arm 71 that forms the first link mechanism 51 together with the second link arm 72 and supports the front door 31 on the vehicle body 2, such as a shape and an arrangement of the link cover 220, may be freely changed. For example, when the front door 31 is in the fully closed state, the link cover 220 may be integrated with the inner side surface 31*s* of the front door 31 with a gap therebetween. That is, the configuration is not always necessary to be strictly continuous, as long as the configuration is designed to be integrated. The blindfold structure and the protection structure of the second link arm 72 may be freely changed.

In the above embodiment, the first actuator 161 for opening and closing the front door 31 and the second actuator 162 for opening and closing the rear door 32 are provided. The first and second actuators 161, 162 are provided at the first rotary coupling points X1, X1 of the first link arms 71, 81, respectively, in the corresponding first and second link mechanisms 51, 52. Further, the first actuator 161 applies a driving force for rotating the first link arm 71 on the first link mechanism 51 side about the first rotary coupling point X1 with respect to the vehicle body 2. Further, the second actuator 162 also applies a driving force for rotating the first link arm 81 on the second link mechanism 52 side about the first rotary coupling point X1 with respect to the vehicle body 2. However, the embodiment disclosed here is not limited thereto. The arrangement of the actuators 160 and a transmission structure of the driving force may be freely changed. However, it is preferable that the first actuator 161 is disposed inside the dash panel 210 located at the front portion 200*f* of the vehicle interior 200 together with the base end portion 71*x* of the first link arm 71 having the first rotary coupling point X1 with respect to the vehicle body 2. Accordingly, the high design characteristics can be secured.

The embodiment disclosed here may be applied to a configuration in which one or both of the front door 31 and the rear door 32 are manually opened and closed.

Further, a model of the rear door 32 may be freely changed. That is, the door does not need to be opened and closed based on the operation of the link mechanism 20, and may be, for example, a swing door or a rail type slide door.

In the above embodiment, the door opening 3 does not have a pillar structure at the central portion in the vehicle front-rear direction, and has a so-called pillarless structure in which the front opening 4 and the rear opening 5 are integrated. However, the embodiment disclosed here is not limited thereto, and may be applied to a structure in which the door opening 3 having a pillar structure at the central portion in the opening width direction, for example, the front opening 4 and the rear opening 5 are partitioned by a "B pillar". When such a "B pillar" is provided, for example, the striker 175 that engages with the center lock 185 provided at the rear end portion 31*r* of the front door 31 may be disposed here.

In the above embodiment, a pair of door side engagement portions 133, 133 provided at the closing end portion 132 of the rear door 32 and a pair of vehicle body side engagement portions 134, 134 provided at the upper edge portion 3*a* and the lower edge portion 3*b* of the door opening 3 are provided. However, the embodiment disclosed here is not limited thereto. The door side engagement portion 133 and the vehicle body side engagement portion 134 may be provided in the front door 31. For example, when the door opening 3 has a structure extending in the upper-lower direction such as the "B pillar", the vehicle body side engagement portion 134 may be provided here. Further, the number of the door side engagement portions 133 and the vehicle body side engagement portions 134 may also be one, or three or more.

In the above embodiment, the door side engagement portion 133 includes the shaft-shaped engagement portion 151, and the vehicle body side engagement portion 134 has the guide groove 152. However, the embodiment disclosed here is not limited thereto. The door side engagement portion 133 may have the guide groove 152. The vehicle body side engagement portion 134 may include the shaft-shaped engagement portion 151.

According to an aspect of this disclosure, a vehicle door device includes: first and second link arms having a first rotary coupling point with respect to a vehicle body and a second rotary coupling point with respect to a front door of a vehicle. The front door is opened toward a vehicle front side based on an operation of a link mechanism formed of the first and second link arms, and the first link arm has the first rotary coupling point inside a dash panel provided at a front portion of a vehicle interior.

That is, with respect to the first link arm supporting the front door opened toward the vehicle front side, a base end portion side having the first rotary coupling point with respect to the vehicle body is disposed on a front portion side of the vehicle interior. Therefore, the base end portion side is easily visually recognized by the occupant in the vehicle interior. However, according to the above configuration, the base end portion side of the first link arm having the first rotary coupling point can be hidden from the occupant in the vehicle interior. Accordingly, it is possible to secure high design characteristics suitable for the front door of the vehicle.

In many cases, the vehicle door including the front door has a center of gravity in the vicinity of a belt line below a window. Normally, an upper end portion of the dash panel, that is, a dashboard, is also disposed at a height in the vicinity of the belt line. Therefore, according to the above configuration, a load of the front door can be stably supported by the first link arm in which the first rotary coupling point with respect to the vehicle body is provided inside the dash panel. It is possible to secure high support rigidity of the front door without requiring special reinforcement on a vehicle body side. Accordingly, it is possible to secure high adaptability to the front door of the vehicle.

The vehicle door device according to the above aspect preferably includes a link cover configured to rotate together with the first link arm in a state of covering the first link arm.

According to the above configuration, it is possible to secure the high design characteristics suitable for the front door of the vehicle.

In the vehicle door device according to the above aspect, it is preferable that, when the front door is in a fully closed state, the link cover is disposed integrally with an inner side surface of the front door and the dash panel.

According to the above configuration, it is possible to secure the high design characteristics more suitable for the front door of the vehicle.

The vehicle door device according to the above aspect preferably includes a cover member provided in a gap formed between the link cover and the dash panel when the front door is opened.

According to the above configuration, the base end portion side of the first link arm facing the vehicle interior side from the gap between the link cover and the dash panel can be hidden by the cover member. Accordingly, it is possible to secure the high design characteristics suitable for the front door of the vehicle.

In the vehicle door device according to the above aspect, it is preferable that the second link arm has the first rotary coupling point inside an interior member that is located on an outer side of a foot space in a vehicle width direction, the foot space being formed below the dash panel.

According to the above configuration, the base end portion of the second link arm having the first rotary coupling point with respect to the vehicle body can be disposed at a position that is difficult to be seen by the occupant in the vehicle interior. Accordingly, it is possible to secure the high design characteristics suitable for the front door of the vehicle.

In a state in which the front door is in a fully opened position, the second link arm supporting the front door can be disposed at a position deviated from the flow line of the occupant who gets on and off the vehicle. Further, a large door opening amount can be set for the front door. Accordingly, it is possible to secure good getting-on-and-off performance suitable for the front door.

In addition, a large separation distance can be set between the first and second link arms in an upper-lower direction of the vehicle. Therefore, according to the above configuration, the first link mechanism formed of the first and second link arms can stably support the load of the front door. It is possible to secure the high support rigidity of the front door without requiring special reinforcement on the vehicle body side. Accordingly, it is possible to secure high adaptability to the front door of the vehicle.

In the vehicle door device according to the above aspect, it is preferable that the front door has an accommodation recess for accommodating the second link arm therein when the front door is in a fully closed state, and a lid member configured to cover an opening of the accommodation recess in a state in which the second link arm is accommodated in the accommodation recess.

According to the above configuration, when the front door is in the fully closed state, it is difficult for the occupant in the vehicle interior to visually recognize the second link arm. Accordingly, it is possible to secure the high design characteristics suitable for the front door of the vehicle.

In the vehicle door device according to the above aspect, it is preferable that the second link arm has the first rotary coupling point at a lower edge portion of a door opening in which the front door is provided.

According to the above configuration, the base end portion of the second link arm having the first rotary coupling point with respect to the vehicle body can be disposed at a position that is difficult to be seen by the occupant in the vehicle interior. In a state in which the front door is in the fully opened position, the second link arm supporting the front door can be disposed at a position deviated from the flow line of the occupant who gets on and off the vehicle. Further, a large door opening amount can be set for the front door. Accordingly, it is possible to secure the high design characteristics and good getting-on-and-off performance suitable for the front door of the vehicle.

By setting the large separation distance between the first and second link arms forming the first link mechanism, it is possible to stably support the load of the front door. It is possible to secure the high support rigidity of the front door without requiring special reinforcement on the vehicle body side.

In the vehicle door device according to the above aspect, it is preferable that the lower edge portion of the door opening has a recess for accommodating the second link arm therein when the front door is in a fully closed state.

According to the above configuration, when the front door is in the fully closed state, the front door and the second link arm can be prevented from interfering with each other.

The vehicle door device according to the above aspect preferably includes an actuator configured to apply a driving force to the link mechanism to open and close the front door. The actuator is preferably provided inside the dash panel.

According to the above configuration, the first link arm constituting the first link mechanism can be rotated about the first rotary coupling point based on the driving force of the first actuator. Accordingly, the front door supported by the first link mechanism can be stably opened and closed.

Further, the first actuator disposed on the front portion side of the vehicle interior together with the base end portion of the first link arm having the first rotary coupling point can be hidden from the occupant in the vehicle interior. Accordingly, it is possible to secure the high design characteristics suitable for the front door of the vehicle. In addition, there is an advantage that wiring for the first actuator can be facilitated.

According to this disclosure, it is possible to secure high adaptability to a front door of a vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle comprising:
a vehicle body;
a vehicle interior;
a front door;
a dash panel; and
a vehicle door device for opening and closing the front door, the vehicle door device comprising:
    first and second link arms each having a first rotary coupling point with respect to the vehicle body and each having a second rotary coupling point with respect to the front door, the first link arm and the second link arm being independent physically separate from each other, and the first link arm being disposed above the second link arm, wherein
the front door is opened toward a vehicle front side based on an operation of a link mechanism formed of the first and second link arms,
the first link arm has the first rotary coupling point inside the dash panel provided at a front portion of the vehicle interior,
in a fully open position of the front door, the second rotary coupling point is forward of the first rotary coupling point in a front-rear direction of the vehicle for each of the first and second link arms, and
the second rotary coupling point of the first link arm is closer to a center of gravity of the front door than the second rotary coupling point of the second link arm, and
the first rotary coupling point of the first link arm is formed by a base end portion of the first link arm and a coupling bracket, the coupling bracket being disposed inside the dash panel.

2. The vehicle according to claim 1, further comprising:
a link cover configured to rotate together with the first link arm in a state of covering the first link arm.

3. The vehicle according to claim 2, wherein
when the front door is in a fully closed state, the link cover is disposed integrally with an inner side surface of the front door and the dash panel.

4. The vehicle deer device according to claim 3, further comprising:
a cover member provided in a gap formed between the link cover and the dash panel when the front door is opened.

5. The vehicle deer device according to claim 1, wherein
the second link arm has the first rotary coupling point inside an interior member that is located on an outer side of a foot space in a vehicle width direction, the foot space being formed below the dash panel.

6. The vehicle according to claim 5, wherein
the front door has an accommodation recess for accommodating the second link arm therein when the front door is in a fully closed state, and a lid member configured to cover an opening of the accommodation recess in a state in which the second link arm is accommodated in the accommodation recess.

7. The vehicle according to claim 1, wherein
the second link arm has the first rotary coupling point at a lower edge portion of a door opening in which the front door is provided.

8. The vehicle according to claim 7, wherein
the lower edge portion of the door opening has a recess for accommodating the second link arm therein when the front door is in a fully closed state.

9. The vehicle according to claim 1, further comprising:
an actuator configured to apply a driving force to the link mechanism to open and close the front door, the actuator being provided inside the dash panel.

10. The vehicle according to claim 1, wherein the first link arm supports a larger door load than the second link arm.

* * * * *